US009727132B2

(12) United States Patent
Liu et al.

(10) Patent No.: US 9,727,132 B2
(45) Date of Patent: *Aug. 8, 2017

(54) MULTI-VISOR: MANAGING APPLICATIONS IN AUGMENTED REALITY ENVIRONMENTS

(75) Inventors: James Chia-Ming Liu, Bellevue, WA (US); Anton Oguzhan Alford Andrews, Seattle, WA (US); Craig R. Maitlen, Woodinville, WA (US); Sheridan Small, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/175,328

(22) Filed: Jul. 1, 2011

(65) Prior Publication Data

US 2013/0007668 A1    Jan. 3, 2013

(51) Int. Cl.
*G06F 3/01*        (2006.01)
*G06F 3/0482*    (2013.01)

(52) U.S. Cl.
CPC ............ *G06F 3/012* (2013.01); *G06F 3/013* (2013.01); *G06F 3/017* (2013.01); *G06F 3/0482* (2013.01)

(58) Field of Classification Search
CPC .......... G06F 3/012; G06F 3/017; G06F 3/011; G06F 17/50; G06F 19/3406; G06F 19/3418; G06F 3/0482; G06T 7/00; G06T 11/00; G06T 2211/428; G06T 345/08; G06T 345/633; G02B 27/0093; G02B 27/01; G02B 27/017; G02B 2027/0123;

(Continued)

(56) References Cited

U.S. PATENT DOCUMENTS

| | | | |
|---|---|---|---|
| 3,936,148 A * | 2/1976 | Ellis | 359/630 |
| 4,040,744 A * | 8/1977 | Schertz et al. | 356/141.1 |
| 5,621,424 A * | 4/1997 | Shimada et al. | 345/8 |
| 5,703,604 A * | 12/1997 | McCutchen | 345/8 |
| 5,861,994 A * | 1/1999 | Kelly | 359/630 |
| 5,886,675 A * | 3/1999 | Aye | G02B 27/225 345/7 |

(Continued)

OTHER PUBLICATIONS

Caudell, Thomas P. and Mizell, David W., "Augmented Reality: An Application of Heads-up Display Technology to Manual Manufacturing Processes," System Sciences, 1992. Proceedings of the Twenty-Fifth Hawaii International Conference on , vol. ii, no., pp. 659,669 vol. 2, Jan. 7-10, 1992.*

(Continued)

*Primary Examiner* — Maryam Ipakchi
(74) *Attorney, Agent, or Firm* — Vierra Magen Marcus LLP

(57) ABSTRACT

A system and method are provided that enhances a user's experience when using a see-through near eye display device. A user interface is provided for a user to manage single or simultaneous applications in a head mounted device. Applications for the head mounted device may be activated or deactivated by the user via the user-interface. The user's total field of view (TFOV) which accounts for a complete range of rotation and translation of the user's head may be determined by tracking the user's head position and rotation relative to the user's body and an environment associated with the user. One region of the user's TFOV (e.g., the right-hand side) may display an "application menu" including a list of applications that can be launched, and another region of the user's TFOV (e.g., the left-hand side) may display an "active menu" including a list of applications currently running.

17 Claims, 14 Drawing Sheets

(58) Field of Classification Search
CPC ........ G02B 2027/0138; G02B 27/0172; G02B 13/14; G02B 2027/014; G02B 2027/0187; G02B 2027/0154; G02B 2027/0156; G02B 2027/0161; G02B 2027/0178; H04N 21/4728; H04N 13/0472; H04N 13/044; H04N 13/0429; H04N 5/7491; G06K 17/0022
USPC .............. 715/841, 771, 772, 818, 817, 769; 345/633, 629, 7, 8
See application file for complete search history.

(56) References Cited

U.S. PATENT DOCUMENTS

| | | | |
|---|---|---|---|
| 5,912,650 A * | 6/1999 | Carollo | 345/7 |
| 5,954,642 A | 9/1999 | Johnson et al. | |
| 5,999,185 A * | 12/1999 | Kato | G06F 3/011 345/420 |
| 6,057,810 A * | 5/2000 | Roell | G09B 9/307 345/8 |
| 6,072,632 A * | 6/2000 | Ophey | 359/633 |
| 6,118,414 A * | 9/2000 | Kintz | G09B 9/308 345/31 |
| 6,133,944 A * | 10/2000 | Braun et al. | 348/39 |
| 6,157,382 A * | 12/2000 | Ohshima et al. | 345/419 |
| 6,160,899 A * | 12/2000 | Lee | G06F 3/017 348/77 |
| 6,348,927 B1 * | 2/2002 | Lipkin | H04L 67/02 345/419 |
| 6,665,003 B1 * | 12/2003 | Peleg et al. | 348/36 |
| 6,714,665 B1 * | 3/2004 | Hanna et al. | 382/117 |
| 6,771,294 B1 * | 8/2004 | Pulli et al. | 715/863 |
| 6,909,443 B1 * | 6/2005 | Robertson | G06F 3/0481 715/782 |
| 7,116,342 B2 * | 10/2006 | Dengler | G06T 15/20 345/619 |
| 7,168,050 B1 * | 1/2007 | Kwon | G06F 3/0482 348/E17.006 |
| 7,170,492 B2 * | 1/2007 | Bell | 345/158 |
| 7,176,945 B2 * | 2/2007 | Ohba | 345/629 |
| 7,246,329 B1 * | 7/2007 | Miura et al. | 715/810 |
| 7,557,816 B2 * | 7/2009 | Kuroki | 345/633 |
| 7,653,213 B2 * | 1/2010 | Longhurst | G01S 3/7865 345/418 |
| 7,886,229 B2 * | 2/2011 | Pachet | 715/726 |
| 8,144,121 B2 * | 3/2012 | Kitaura | 345/156 |
| 8,159,458 B2 * | 4/2012 | Quennesson | 345/157 |
| 8,223,088 B1 * | 7/2012 | Gomez et al. | 345/7 |
| 8,253,685 B2 * | 8/2012 | Katayama | 345/157 |
| 9,041,623 B2 * | 5/2015 | Liu | G09G 5/377 345/7 |
| 9,041,806 B2 * | 5/2015 | Baur et al. | 348/148 |
| 9,046,685 B2 * | 6/2015 | Nakada | G02B 27/01 |
| 2002/0036649 A1 * | 3/2002 | Kim et al. | 345/633 |
| 2002/0075295 A1 * | 6/2002 | Stentz et al. | 345/727 |
| 2002/0191028 A1 * | 12/2002 | Senechalle et al. | 345/800 |
| 2003/0020707 A1 * | 1/2003 | Kangas et al. | 345/418 |
| 2003/0076415 A1 * | 4/2003 | Strumolo | 348/149 |
| 2004/0056896 A1 * | 3/2004 | Doblmayr et al. | 345/769 |
| 2004/0066414 A1 * | 4/2004 | Czerwinski et al. | 345/781 |
| 2004/0113885 A1 * | 6/2004 | Genc et al. | 345/156 |
| 2004/0119662 A1 * | 6/2004 | Dempski | G01S 3/7864 345/8 |
| 2004/0201857 A1 * | 10/2004 | Foxlin | 356/620 |
| 2004/0227703 A1 * | 11/2004 | Lamvik et al. | 345/76 |
| 2005/0094019 A1 * | 5/2005 | Grosvenor et al. | 348/335 |
| 2005/0152447 A1 * | 7/2005 | Jouppi et al. | 375/240.01 |
| 2005/0271301 A1 * | 12/2005 | Solomon | G01C 11/02 382/294 |
| 2006/0061544 A1 * | 3/2006 | Min et al. | 345/156 |
| 2006/0208169 A1 * | 9/2006 | Breed et al. | 250/221 |
| 2006/0250322 A1 | 11/2006 | Hall et al. | |
| 2006/0271869 A1 * | 11/2006 | Thanu et al. | 715/764 |
| 2006/0284792 A1 * | 12/2006 | Foxlin | G02B 27/017 345/8 |
| 2007/0058261 A1 * | 3/2007 | Sugihara et al. | 359/630 |
| 2007/0162842 A1 * | 7/2007 | Ambachtsheer et al. | 715/513 |
| 2007/0194902 A1 * | 8/2007 | Blanco et al. | 340/461 |
| 2007/0218995 A1 * | 9/2007 | Didato | 463/37 |
| 2007/0229397 A1 * | 10/2007 | Sefton | A63B 71/0622 345/8 |
| 2007/0252832 A1 * | 11/2007 | Ratai | G02B 27/0093 345/427 |
| 2007/0256027 A1 | 11/2007 | Daude | |
| 2007/0296646 A1 * | 12/2007 | Yamamoto | G02B 27/017 345/8 |
| 2008/0005702 A1 * | 1/2008 | Skourup et al. | 715/848 |
| 2008/0174659 A1 * | 7/2008 | McDowall | 348/53 |
| 2008/0184171 A1 * | 7/2008 | Sato | G06F 3/0482 715/841 |
| 2008/0258679 A1 * | 10/2008 | Manico | H02J 7/025 320/106 |
| 2009/0083655 A1 * | 3/2009 | Beharie et al. | 715/781 |
| 2009/0189830 A1 * | 7/2009 | Deering et al. | 345/1.3 |
| 2009/0208052 A1 * | 8/2009 | Kaplan | 382/103 |
| 2009/0243965 A1 | 10/2009 | Price et al. | |
| 2009/0256904 A1 * | 10/2009 | Krill | G02B 27/0172 348/47 |
| 2009/0307631 A1 * | 12/2009 | Kim et al. | 715/830 |
| 2009/0309811 A1 * | 12/2009 | Hinton | G02B 27/017 345/8 |
| 2009/0313584 A1 * | 12/2009 | Kerr et al. | 715/849 |
| 2010/0045783 A1 | 2/2010 | State et al. | |
| 2010/0060990 A1 * | 3/2010 | Wertheim et al. | 359/632 |
| 2010/0091110 A1 * | 4/2010 | Hildreth | G06F 3/011 348/169 |
| 2010/0149073 A1 * | 6/2010 | Chaum et al. | 345/8 |
| 2010/0156787 A1 * | 6/2010 | Katayama | 345/157 |
| 2010/0164990 A1 * | 7/2010 | Van Doorn | 345/633 |
| 2010/0182340 A1 * | 7/2010 | Bachelder et al. | 345/633 |
| 2010/0199232 A1 * | 8/2010 | Mistry et al. | 715/863 |
| 2010/0214414 A1 * | 8/2010 | Spruck | 348/158 |
| 2010/0226535 A1 * | 9/2010 | Kimchi et al. | 382/103 |
| 2010/0246003 A1 * | 9/2010 | Simmonds et al. | 359/567 |
| 2010/0287468 A1 * | 11/2010 | Reifman et al. | 715/702 |
| 2010/0290126 A1 | 11/2010 | Domjan et al. | |
| 2011/0087989 A1 * | 4/2011 | McCann | G06F 3/04817 715/772 |
| 2011/0119640 A1 | 5/2011 | Berkes et al. | 715/863 |
| 2011/0197263 A1 * | 8/2011 | Stinson, III | 726/4 |
| 2011/0205242 A1 * | 8/2011 | Friesen | 345/633 |
| 2011/0279676 A1 * | 11/2011 | Terada et al. | 348/148 |
| 2012/0007772 A1 * | 1/2012 | Parssinen et al. | 342/176 |
| 2012/0050143 A1 * | 3/2012 | Border | G09G 3/3611 345/8 |
| 2012/0096397 A1 * | 4/2012 | Ording et al. | 715/802 |
| 2012/0113140 A1 * | 5/2012 | Hilliges et al. | 345/633 |
| 2012/0113209 A1 * | 5/2012 | Ritchey et al. | 348/14.02 |
| 2012/0144331 A1 * | 6/2012 | Tolonen et al. | 715/769 |
| 2012/0154277 A1 * | 6/2012 | Bar-Zeev et al. | 345/158 |
| 2012/0176308 A1 * | 7/2012 | Westermann et al. | 345/156 |
| 2012/0176410 A1 * | 7/2012 | Meier et al. | 345/633 |
| 2012/0182205 A1 * | 7/2012 | Gamst | 345/7 |
| 2012/0235902 A1 * | 9/2012 | Eisenhardt et al. | 345/156 |
| 2012/0240077 A1 * | 9/2012 | Vaittinen et al. | 715/781 |
| 2012/0249741 A1 * | 10/2012 | Maciocci et al. | 348/46 |
| 2012/0254791 A1 * | 10/2012 | Jackson | G06F 3/0482 715/781 |
| 2012/0299968 A1 * | 11/2012 | Wong et al. | 345/661 |
| 2012/0304128 A1 * | 11/2012 | Woo et al. | 715/848 |
| 2013/0093789 A1 * | 4/2013 | Liu et al. | 345/633 |
| 2013/0300637 A1 * | 11/2013 | Smits et al. | 345/8 |
| 2015/0153571 A1 * | 6/2015 | Ballard | G02B 27/017 345/8 |

OTHER PUBLICATIONS

Caudell, Thomas P. and Mizell, David W., "Augmented Reality: An Application of Heads-up Display Technology to Manual Manufacturing Processes," System Sciences, 1992. Proceedings of the

(56) References Cited

OTHER PUBLICATIONS

Twenty-Fifth Hawaii International Conference on, vol. ii, no., pp. 659,669 vol. 2, Jan. 7-10, 1992.*

Caudell, Thomas P. and Mizell, David W., "Augmented Reality: An Application of Heads-up DisplayTechnologyto Manual Manufacturing Processes," System Sciences, 1992. Proceedings of the Twenty-Fifth Hawaii International Conference on, vol. ii, no., pp. 659,669 vol.2, Jan. 7-10, 1992.*

Caudell, Thomas P.and Mizell, David W., "Augmented Reality: An Application of Heads-up Display Technology to Manual Manufacturing Processes," System Sciences, 1992. Proceedings of the Twenty-Fifth Hawaii International Conference on, vol. ii, no., pp. 659,669 vol. 2, Jan. 7-10, 1992.*

International Search Report and Written Opinion dated Dec. 28, 2012 in International Patent Application No. PCT/US2012/045168.

Zhang, Rui and Hong Hua. "Design of a polarized head-mounted projection display using FLCOS microdisplays". Proceedings of the SPIE International Society for Optical Engineering (Photonic West 2007), vol. 6489, 64890B, San Jose, USA, Jan. 2007. 10 pages.

\* cited by examiner

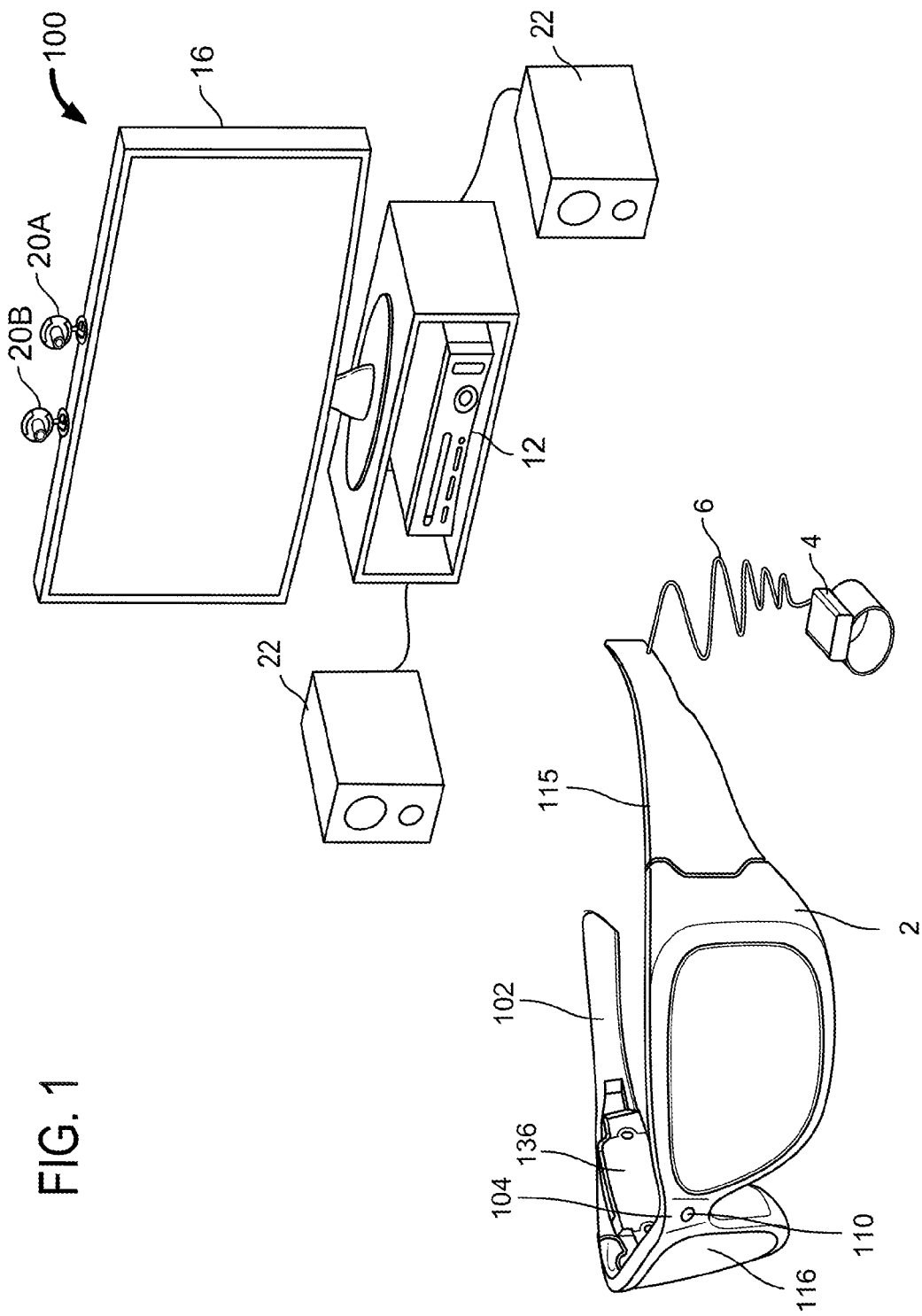

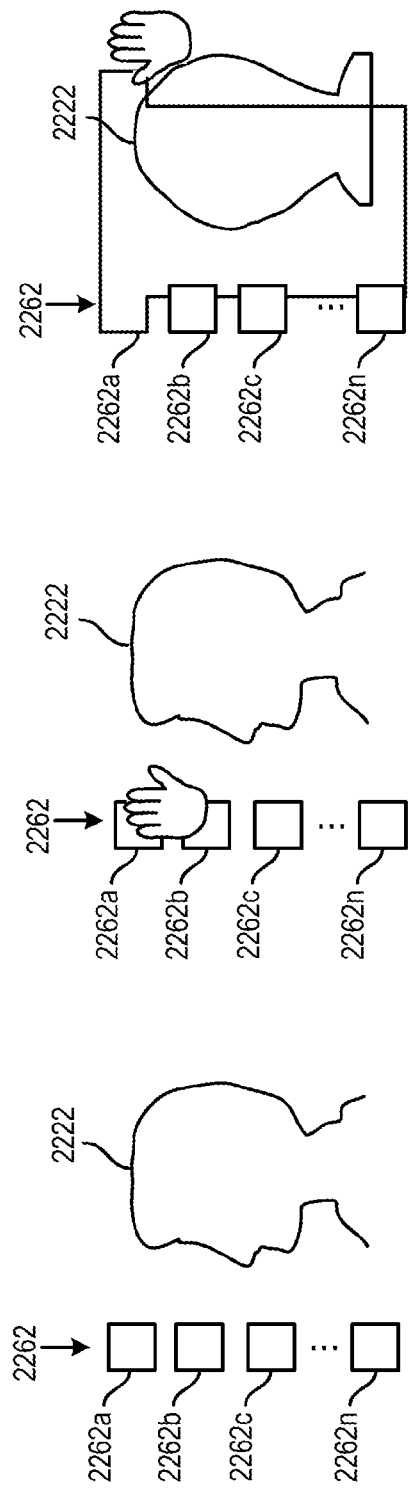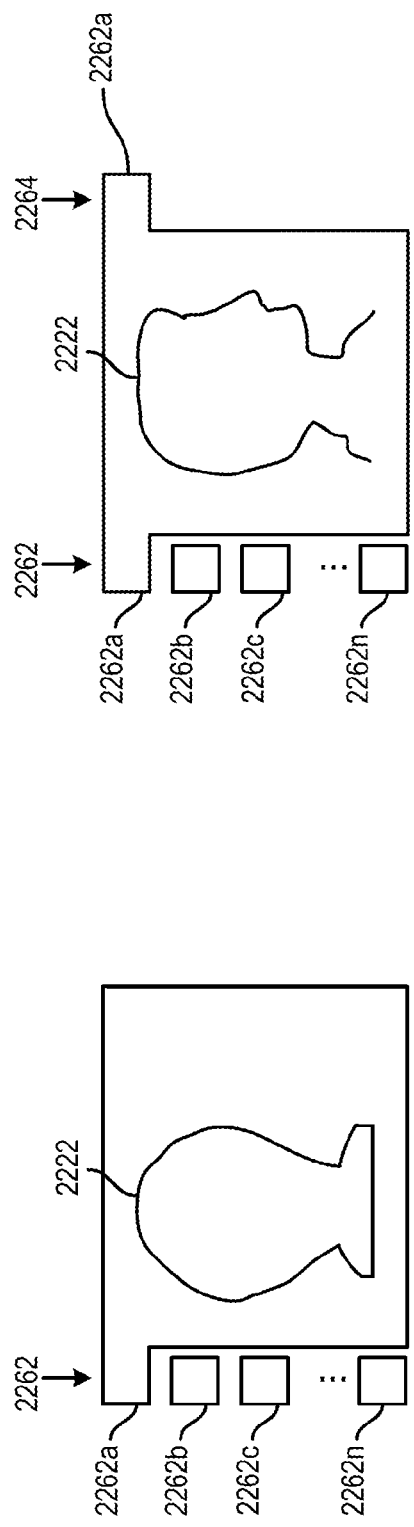

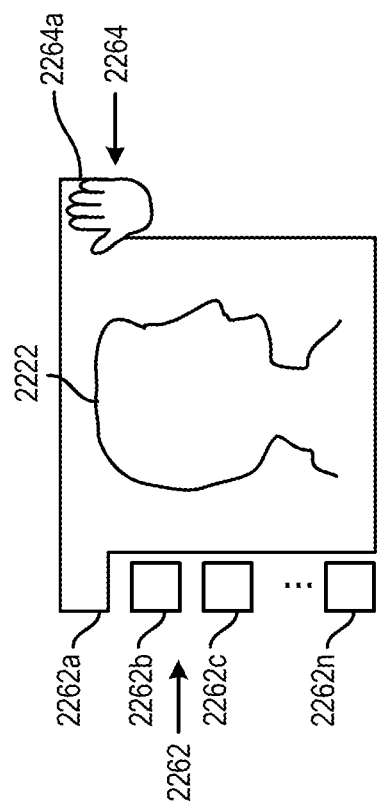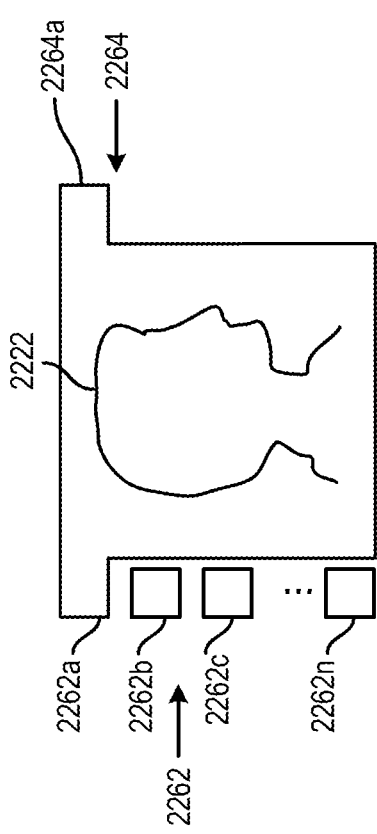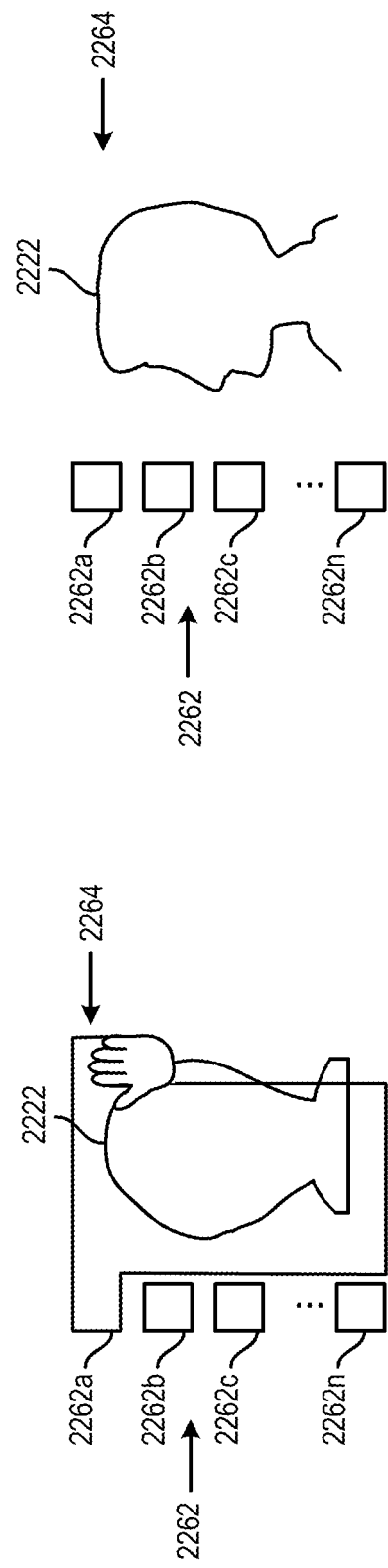

MULTI-VISOR: MANAGING APPLICATIONS IN AUGMENTED REALITY ENVIRONMENTS

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR implementation may be used to enhance numerous applications including video game, mapping, navigation, and mobile device applications.

A near-eye display such as a head mounted display (HMD) may be worn by a user to view the mixed imagery of virtual and real objects. A near-eye display uses a combination of optics and stereopsis to focus virtual imagery in the user's field of view.

SUMMARY

A system and method are provided that enhances a user's experience when using a see-through near eye display device. A user interface is provided for a user to manage single or simultaneous applications in a head mounted display device. Applications for the head mounted device may be activated or deactivated by the user via the user-interface. The user's total field of view (TFOV) which accounts for a complete range of rotation and translation of the user's head may be determined by tracking the user's head position and rotation relative to the user's body and an environment associated with the user. A first region of the user's TFOV may display an application menu including a list of applications that can be launched, and a second region of the user's TFOV may display an active menu including a list of applications currently running in the head mounted display device.

According to one embodiment, techniques are provided for providing a user interface to manage one or more applications in a head mounted display device associated with a user. A total field of view of a user is determined. A first menu including a list of one or more applications that can be activated in the head mounted display device is generated and displayed in a first region of the total field of view of the user. An application from the list of one or more applications provided in the first menu is activated via the first menu. A second menu including a list of one or more applications that are currently running in the head mounted display device is generated and displayed in a second region of the total field of view of the user. The second menu includes the application activated.

One embodiment includes a head mounted display device. The head mounted display includes a display coupling at least a portion of an optimized image to a user's focal region. Inertial, magnetic, mechanical and/or other sensors sense orientation information for the head mounted display device and eye tracking sensors detect user eye position. A processing unit, in communication with the display, inertial and/or other sensors and eye tracking sensors, automatically determines a total field of view of the user. The processing device then generates a first menu including a list of one or more applications to be activated in the head mounted display device and displays the first menu in a first region of the total field of view of the user. The process receives a user selection to activate an application from the list of one or more applications provided in the first menu. The process further generates a second menu including a list of one or more applications that are currently running in the head mounted display device and displays the second menu in a second region of the total field of view of the user. The second menu includes the application activated by the user.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 1 is an example system according to an embodiment of the present technology.

FIGS. 2C-2G illustrate one embodiment of targeting and activating an application.

FIGS. 2H-2K illustrate one embodiment of targeting and de-activating an application.

DETAILED DESCRIPTION

Figure 2A:
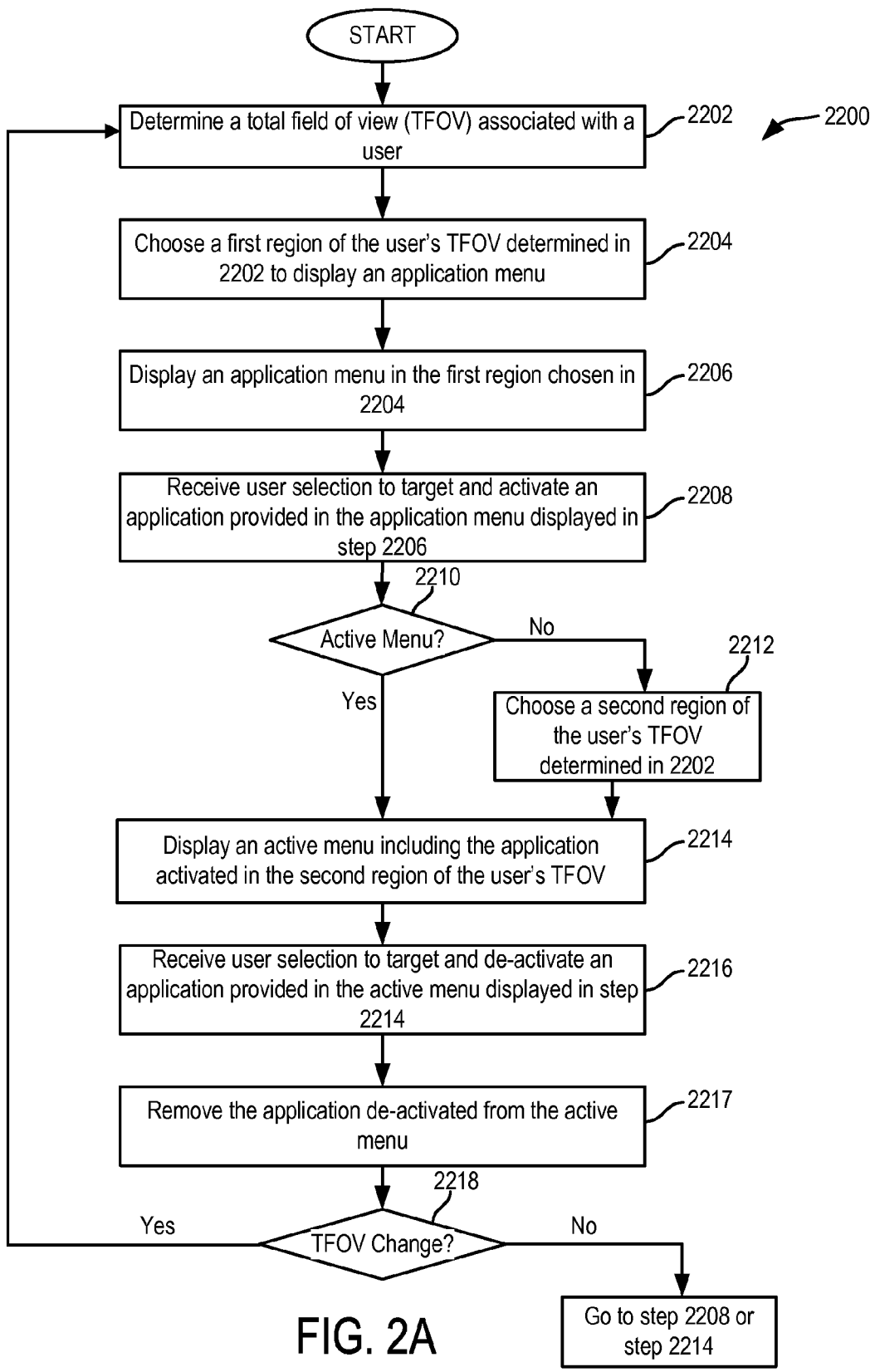
FIG. 2A is a simplified flow chart depicting a process according to an embodiment of the present technology.

Technology is disclosed by which a user's experience when using a near eye display device is enhanced. A user interface is provided for a user to manage single or simultaneous applications in a head mounted device. Applications can be activated or deactivated, as well as overlaid on top of each other for simul-tasking, via the user-interface provided. In one embodiment, the user's total field of view (TFOV)

which accounts for a complete range of rotation and translation of the user's head may be determined by tracking the user's head position and rotation relative to determine the user's body and environment associated with the user. One region of the user's TFOV (e.g., the right-hand side of the user's TFOV) may display a "visor menu" to provide visual cues for applications that can be launched or layered, and another region of the user's TFOV (e.g., the left-hand side of the user's TFOV) may display an "active-visors" menu to provide visual cues for applications currently running. The user may activate or deactivate one or more applications in the head mounted device via the menus provided.

The present technology will now be described in reference to FIGS. 1-9. FIG. 1 is an example system 100 according to an embodiment of the present technology. The various components and modules depicted in system 100 of FIG. 1 are merely examples of components that may be included in system 100. In alternate embodiments, system 100 may have less or more components than those shown. The modules and components in system 100 may be implemented in software (e.g., code, program, instructions that are stored on a machine-readable medium and executed by a processor), hardware, or combinations thereof. In the following discussion, the term "application" is interpreted broadly to include all kinds of applications such as an instant messaging (IM) application, a word application, a spreadsheet application, a video application, etc.

Referring to FIG. 1, system 100 includes a see-through display device as a near-eye, head mounted display device 2 in communication with a processing unit 4 via a wire 6. In other embodiments, head mounted display device 2 communicates with processing unit 4 via wireless communication (e.g., WiFi, Bluetooth, infra-red, or other wireless communication means). Head mounted display device 2, which in one embodiment is in the shape of eyeglasses in a frame 115, is worn on the head of a user so that the user can see through a display and thereby have an actual direct view of the space in front of the user. Throughout this document, the use of the term "actual direct view" refers to the ability to see real world objects directly with the human eye, rather than seeing created image representations of the real world objects. For example, looking through glass at a room allows a user to have an actual direct view of the room, while viewing a video of a room on a television is not an actual direct view of the room. Based on the context of executing software, for example, a gaming application, system 100 can project virtual images on a display that are viewable by the user wearing a see-through display device while the user is also viewing real world objects through the display.

Although head mounted display device 2 is in the form of glasses as depicted in FIG. 1, head mounted display device 2 may take other forms, such as a helmet with goggles.

Frame 115 of head mounted display device 2 may include a temple or side arm for resting on each of the user's ears. Temple 102 is representative of an embodiment of the right temple. A nose bridge 104 of the frame includes a microphone 110 for recording sounds and transmitting audio data to processing unit 4, as described below.

In one embodiment, processing unit 4 may include much of the computing power used to operate head mounted display device 2. Processing unit 4 may communicate wirelessly (e.g., WiFi, Bluetooth, infra-red, or other wireless communication means) to a hub computing systems 12.

Hub computing system 12 may be a computer, a gaming system or console, or the like. According to an example embodiment, hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

In various embodiments, the processes described herein with respect to FIGS. 2 and 7-9 are performed in whole or in part by head mounted display device 2, processing unit 4, hub computing system 12, or a combination thereof.

Hub computing system 12 may include one or more capture devices, such as capture devices 20A and 20B, to capture the room or other physical environment associated with the user. In other embodiments, more or less than two capture devices may be used to capture the room or other physical environment associated with the user.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character. An application may be executing on hub computing system 12, head mounted display device 2, a mobile device or a combination thereof.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. Audiovisual device 16 may receive the audiovisual signals from hub computing system 12 and may then output the game or application visuals and/or audio associated with the audiovisual signals. According to one embodiment, audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo, or hub computing system 12, is connected to external speakers 22.

In one embodiment of the disclosed technology, and as will be discussed in detail below, system 100 provides a user interface for a user to manage single or simultaneous applications in head mounted device 2. Applications for head mounted device 2 can be activated or deactivated, as well as overlaid on top of each other for simul-tasking, via the user-interface. The user's total field of view (TFOV) which accounts for a complete range of rotation and translation of the user's head may be determined by tracking the user's head position and rotation relative to the environment and the user's body. A first region of the user's TFOV (e.g., the right-hand side) may display an "active-visors" menu that provides visual cues for applications currently running and a second region of the user's TFOV (e.g., the left-hand side) may display a "visor menu" that provides visual cues for applications that can be launched or layered.

FIG. 2A is a simplified flow chart depicting a process 2200 according to an embodiment of the present technology. In one embodiment, the processing depicted in FIG. 2A may be performed by one or more components of system 100 as depicted in FIG. 1. Process 2200 of FIG. 2A will be described in relation to FIGS. 2B-2K, 2V, and 2X.

At step 2202, a total field of view associated with a user wearing head mounted display device 2 is determined. As noted above, the total field of view for the user accounts for a complete range of rotation and translation of the user's head which may be determined by tracking the user's head position and rotation relative to the environment and the user's body. The total field of view for the user is a function of: the user's environment or scene, the user's head position and rotation, and the user's body. In one embodiment, step 2202 may be performed using head mounted display device 2, processing unit 4 and/or hub computing device 12 as each of the devices includes a subset of sensors that are used to obtain the data for determining the total field of view for the user.

In one example implementation, various sensor technologies embedded in head mounted display device 2 including inertial sensing using inertial measurements from accelerometers and gyroscopes, global positioning system (GPS), eye tracking process as described below to refine the determined orientation by identifying where in particular the user is looking at (also known as the user's focal region or depth focus), and/or other technologies may be used to identify and continuously track the user's head position and rotation relative to the user's environment and relative to the user's body (e.g., when the user is looking straight ahead, to the right, or to the left). Other techniques may include time of flight, spatial scan, mechanical linkages, phase-difference sensing, and/or direct field sensing. In such cases, additional hardware may be needed in the head mounted display. More details of head mounted display device 2 and processing unit 4 will be described below with respect to FIGS. 3, 4A and 4B.

In one embodiment, hub computing device 12 may be used to track the user and head mounted display device 2 to provide a preliminary determination of location and orientation of head mounted display device 2. Various sensor technologies may be implemented in hub computing device 12 including RGB camera, depth sensor, and/or other technologies to determine location and orientation of head mounted display device 2. More details of hub computing device 12 will be described below with respect to FIG. 5.

Additional information such as information retrieved from the cloud, information detected and/or gathered by one or more external devices, and other relevant information may also be used to identify and continuously track the user's head position and rotation. Techniques such as Simultaneous Localization and Mapping (SLAM) using RGB and/or depth sensor data may be employed to provide a real-time position of the user's head relative to the mapped environment. Environmental typography may be identified using data from the cloud and/or depth sensor data. Regions of the user's body can be identified (e.g., hand, arm, torso, legs) using the depth sensor when the user is looking at him or herself.

It should be recognized that not all sensor information and/or sensing technologies as discussed above are required at all times. One or more sensors may be used as redundancies to further refine the measurement of the total field of view of the user.

In one embodiment, the calculations that determine the user's total field of view in step 2202 may be performed by hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 2. More details of step 2202 will be described below with respect to FIG. 7.

Figure 2V:
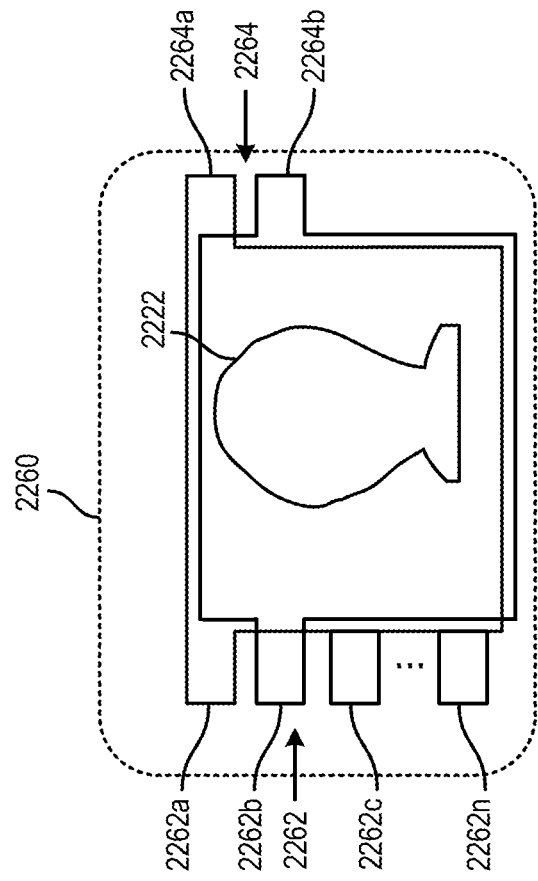
FIG. 2V illustrates an active menu displayed in a region of the user's total field of view according to an embodiment of the present technology.
Figure 2B:
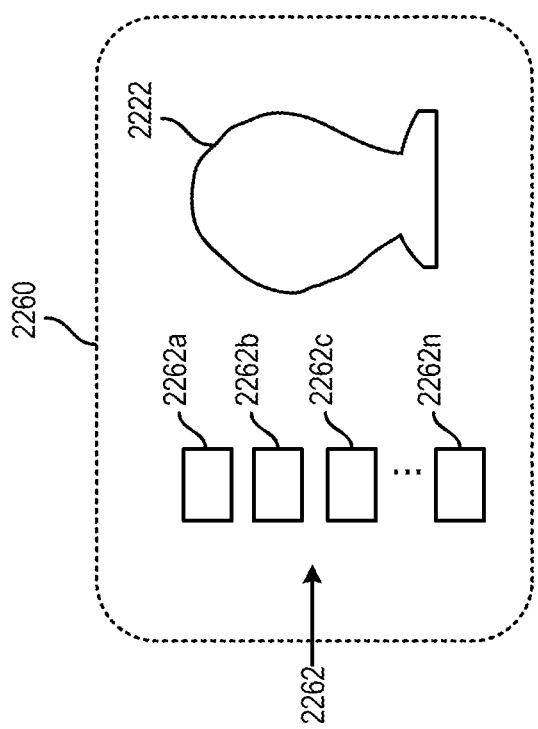
FIG. 2B illustrates an application menu displayed in a region of the user's total field of view according to an embodiment of the present technology.
Figure 2X:
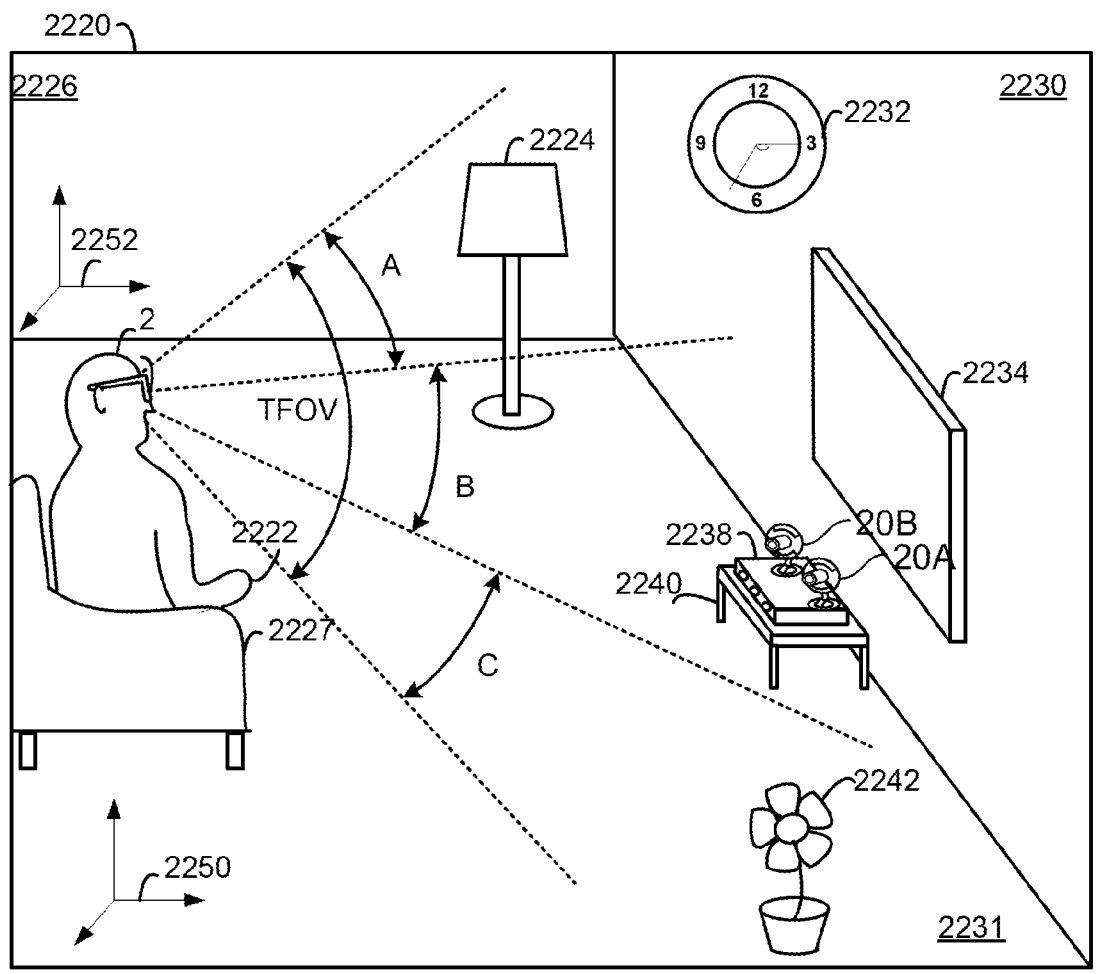
FIG. 2X illustrates one embodiment of a user's total field of view in an environment.

FIG. 2X illustrates a user 2222 wearing head mounted display device 2 in an environment 2220. In this example, the user's head position and orientation relative to environment 2220 and the user's body are continuously tracked at different instances of time such that the user's total field of view can be ascertained. For example, at a given instance of time such as time T1, user 2222's head position and orientation relative to environment 2220 and the user's body are identified using the various sensor technologies as described above, and user 2222 is shown viewing a field of view (defined by region "A") including a lamp 2224, clock 2232, a portion of wall 2230, and a portion of wall 2226. Likewise, at time T2, user 2222 is shown viewing a field of view (defined by region "B") including a table 2240, processing device 2238, capture devices 20A, 20B, and display 2234, floor 2231, and a portion of wall 2230. At time T3, user 2222 is shown viewing a field of view (defined by region "C") including a flower 2242, floor 2231, and a portion of wall 2230. The environment 2220 may be defined relative to a coordinate system 2250, and the user's head position defined relative to a second coordinate system 2252.

By identifying and continuously tracking the user's head position and orientation relative to environment 2220 and the user's body at various time instances, the user's total field of view can be ascertained. In the example of FIG. 2X, the user's total field of view encompasses all three regions A, B and C.

Returning to FIG. 2A, at step 2204, for the user's total field of view determined in 2202, a first region of the user's total field of view determined is chosen to display a list of one or more applications that can be activated or launched in head mounted display device 2 (also known as the visor menu or application menu for launching applications in the HMD). For example, in one example implementation, the right-hand side of the user's TFOV displays an application menu for launching one or more applications in head mounted display device 2. Alternatively, the left-hand side of the user's TFOV may be chosen to display the application menu for launching one or more applications in head mounted display device 2. In one embodiment, selecting a particular region in the total field of view determined in 2202 to display an application menu may be based on one or more pre-determined rules, e.g., a rule that designates the right-hand side of the user's TFOV within +/−10 degrees to display an application menu.

In one embodiment, the user's total field of view determined in 2202 may be classified as primary, secondary, and tertiary regions based on one or more pre-determined rules. For example, a rule may specify that when user is in walking state, primary region is within +−35 degrees. By classifying the user's TFOV as primary, secondary, and tertiary regions, user interface and/or other virtual elements may be placed and made visible in the secondary or tertiary regions, thereby avoiding obstructing the user's primary field of view region.

At step 2206, an application menu comprising a list of applications to be activated and/or launched is displayed in the first region of the user's total field of view that was selected in step 2204. In one example implementation, an application menu comprising a list of applications to be activated and/or launched is displayed on the right-hand side of the user's TFOV.

FIG. 2B illustrates an application menu 2262 being displayed on the right-hand side of the user's TFOV 2260. Application menu 2262 as depicted in FIG. 2B includes a list of application icons, e.g., 2262a, 2262b, 2262c . . . , 2262n. Each of these application icons represents a corresponding application that may be activated or launched in head mounted display device 2, as described below. It should be recognized that application menu 2262 may include more or less application icons representing more or less applications than those illustrated in FIG. 2B.

Returning to FIG. 2A, at step 2208, process 2200 receives user selection (user 2222) to target and activate an application from a list of applications provided in the application menu displayed according to step 2206. Various input mechanisms may be employed to target and activate an application including inertial sensing using inertial measurements from accelerometers and gyroscopes, RGB camera, depth sensor, eye tracking (gaze detection), voice recognition, physical input devices such as mouse, phone, remote control device, and/or other mechanisms and technologies. The user may target and activate an application provided in the application menu via direct manipulation (e.g., using depth sensor and/or RGB cameras to capture depth image in order to detect and track the user's motion). For example, the user may physically 'pull' an application over the user's primary field-of-view to activate the application or layer the application with one or more other concurrently running applications. Alternatively, non-direct manipulation techniques such as eye gazing and/or other physical inputs through a secondary device (e.g., mouse, phone, etc.) may be used to target and activate an application provided in the application menu. For example, the user may target and activate an application provided in the application menu by pressing a button on a secondary device. More details of step 2208 will be described below with respect to FIG. 8.

FIGS. 2C-2F illustrate one embodiment in which an application from a list of applications provided in application menu 2262 may be targeted and activated by a user (user 2222). For purpose of illustration, assume that application menu 2262 is displayed on the right-hand side of user's TFOV 2260.

FIG. 2C illustrates that user 2222 has turned his head to the right-hand side of user's TFOV 2260 to view application menu 2262 displayed within that region. Here, user 2222 is shown viewing a list of application icons representing applications 2262a, 2262b, 2262c, and 2262d. However, it should be recognized that user 2222 may view more or less application icons representing applications than those depicted in FIG. 2C. Alternatively, the user may view application menu 2262 without turning the head. For example, the user may view application menu 2262 via eye gazing.

FIG. 2D illustrates that a particular application 2262a from the list of applications provided in application menu 2262 is targeted and selected by user 2222. User 2222 may target and select an application by using various mechanisms including inertial sensing, RGB camera, depth sensor, eye tracking (gaze detection), voice recognition, physical input devices (e.g., mouse, phone, remote control device, etc.), and/or other mechanisms and technologies. For example, the user may target and select application 2262a by physically 'touching' the application. In this case, the user's physical motion is detected and tracked by using depth sensor and/or RGB cameras. Alternatively, non-direct manipulation techniques such as eye gazing and/or physical inputs through a secondary device (e.g., mouse, phone, etc.) may be used to target and select an application, e.g., application 2262a.

FIG. 2E illustrates that application 2262a that has been targeted and selected by user 2222 (see FIG. 2D) is activated. As discussed above, various mechanisms may be used to activate an application via direct manipulation (e.g., using depth sensor and/or RGB cameras) or non-direct manipulation techniques such as eye gazing and/or physical inputs through a secondary device (e.g., mouse, phone, etc.). For direct manipulation, FIG. 2E shows that user 2222 activates application 2262a by physically 'pulls' the application over the user's primary field-of-view.

FIG. 2F illustrates that application 2262a has been activated and currently running in the user's primary field-of-view.

As mentioned earlier, one region of the user's TFOV may display an "active-visors" menu (also known as the "active-visor" menu or simply the active menu) to provide visual cues for applications that are currently running in head mounted display device 2. For example, the left-hand side of the user's TFOV may display an "active-visors" menu comprising a list of one or more applications that are currently running in head mounted display device 2.

Returning to FIG. 2A, at step 2210, process 2200 determines that for the user's total field of view determined in 2202, if there is an existing active menu that is currently being displayed in a region of the user's total field of view determined in 2202.

If there is no active menu currently being displayed in the user's total field of view determined in 2202, then a second region of the user's total field of view determined in 2202 is chosen at step 2212 to display an active menu comprising a list of one or more icons representing one or more active applications that are currently running in head mounted display device 2 (each icon corresponds to one active application currently running in the head mounted display device). In one embodiment, selecting the second region in the total field of view determined in 2202 to display an active menu may be based on one or more pre-determined rules, e.g., a rule that designates the left-hand side of the user's TFOV within +/−10 degrees to display the active menu.

In one example implementation, a second region opposite to the first region (the first region may display an application menu as discussed above) may be selected to display an active menu comprising a list of one or more icons representing one or more active applications that are currently running in head mounted display device 2. For example, the left-hand side of the user's TFOV determined in 2202 may display an active menu, while the right-hand side of the user's TFOV displays an application menu for launching one or more applications in head mounted display device 2.

At step 2214, an active menu (also known as an active-visors menu) is displayed in the second region of the user's total field of view determined in 2202. FIG. 2G illustrates an active menu 2264 displayed on the left-hand side of the user's TFOV 2260. Active menu 2264 as depicted in FIG. 2G includes an icon representing application 2262a that is currently running in head mounted display device 2 (Recall that application 2262a was previously activated in step 2208 of FIG. 2A as described above with reference to FIGS. 2C-2F).

It should be recognized that active menu 2264 as depicted in FIG. 2G may include more than one active application. For example, when another application from the list of applications provided in application menu 2262 is activated (e.g., application 2262b) as described above, then an application icon representing application 2262b is inserted and displayed in active menu 2264.

As noted above, "augmented reality" (AR) applications can "augment" and register with the real environment. In one embodiment, applications running on head-mounted display device 2 do not have chromes, e.g., menu bars, close button, minimize button, expand button, and the like. In addition, multiple applications may run on top of and concurrently with each other (also known as "simul-tasking" or "layered visors"). For example, FIG. 2V illustrates the concept of simul-tasking through layered applications, such as applications 2264a and 2264b that run on top of and concurrently with each other in the user's primary field of view. In one embodiment, these layered applications do not replace the image of a real world object, and therefore, the user can still see the real world object in the environment, e.g., lamp 2224 as depicted in FIG. 2X.

By using the "layered visors" metaphor, users can easily understand which particular application(s) are currently running and intuitively grasp how to control the application(s). Although FIG. 2V only shows two layered applications (2264a and 2264b), there may be more or less layered applications that those shown in FIG. 2V.

As mentioned earlier, a user (e.g., user 2222) may also control application management in head mounted display device 2 by de-activating one or more active applications that are currently running in the head mounted display device.

Returning to FIG. 2A, at step 2216, process 2200 receives user selection to target and de-activate an application that is currently running in head mounted display device 2. In one embodiment, an active application currently running in head mounted display device 2 may be targeted and de-activated by the user via the active menu displayed in step 2214. As described above, an active menu displays a list of one or more active applications that are currently running in head mounted display device 2 in a second region of the user's total field of view determined in 2202.

Various input mechanisms may be employed to target and de-activate an active application including inertial sensing using inertial measurements from accelerometers and gyroscopes, RGB camera, depth sensor, eye tracking (gaze detection), voice recognition, physical input devices such as mouse, phone, remote control device, and/or other mechanisms and technologies. The user may target and de-activate an active application provided in the active menu via direct manipulation (e.g., using depth sensor and/or RGB cameras to capture depth image in order to detect and track the user's motion). For example, the user may physically 'pull' an application (also known as "visor") across the user's field-of-view to de-activate the application. Alternatively, non-direct manipulation techniques such as eye gazing and/or other physical inputs through a secondary device (e.g., press a button on a mouse, phone, etc.) may be used to target and de-activate an application. More details of step 2216 will be described below with respect to FIG. 9.

At step 2217, the application that has been de-activated by the user is removed from the active menu.

FIGS. 2H-2K illustrate one embodiment in which an application from a list of active applications provided in active menu 2264 is de-activated by user 2222. For purpose of illustration, assume that active menu 2264 is displayed on the left-hand side of the user's total field of view 2260 and includes a single icon representing active application 2262a that is currently running in head mounted display device 2.

FIG. 2H illustrates that user 2222 has turned his head to the left-hand side of user's TFOV 2260 to view active menu 2264 displayed within that region. Here, user 2222 is shown viewing application 2262a since application 2262a is the only active application currently running in head mounted display device 2. Alternatively, the user may view active menu 2264 without moving the head. For example, the user may view active menu 2264 via eye gazing.

FIG. 2I illustrates that active application 2262a provided in active menu 2264 is targeted and selected by user 2222. As noted above, user 2222 may target and select an active application (e.g., application 2262a) from active menu 2264 by using various mechanisms including inertial sensing, RGB camera, depth sensor, eye tracking (gaze detection), voice recognition, physical input devices (e.g., mouse, phone, remote control device, etc.), and/or other mechanisms and technologies. For example, FIG. 2I illustrates that the user may target and select application 2262a from active menu 2264 by physically 'touching' the application. In this case, the user's physical motion is detected and tracked by using depth sensor and/or RGB cameras. Alternatively, non-direct manipulation techniques such as eye gazing and/or physical inputs through a secondary device (e.g., mouse, phone, etc.) may be used to target and select an active application (e.g., application 2262a) from active menu 2264.

FIG. 2J illustrates that active application 2262a that was targeted and selected by user 2222 (see FIG. 2I) is de-activated. As noted above, various mechanisms may be used to de-activate an active application from active menu 2264 via either direct manipulation (e.g., using depth sensor and/or RGB cameras) or non-direct manipulation techniques such as eye gazing and/or physical inputs through a secondary device (e.g., mouse, phone, etc.). For example, FIG. 2J shows that user 2222 de-activates application 2262a by physically 'pulls' the application across the user's field-of-view. FIG. 2K illustrates that application 2262a that has been de-activated is removed from the active menu 2264 and returned to application menu 2262.

As noted above, the total field of view for the user accounts for a complete range of rotation and translation of the user's head which may be determined by tracking the user's head position and rotation relative to the environment and the user's body. Returning to FIG. 2A, if the total field of view associated with the user (user 2222) changes at 2218 as the user moves his or head, a new total field of view associated with the user is determined at 2202, and steps 2202-2216 are repeated for the new total field of view determined in step 2202.

If the total field of view associated with the user is not changed at 2218, then processing may return step 2208 in which the user may target and activate another application from the list of applications provided in the application menu displayed in 2206 or step 2216 in which the user may target and de-activate an application from the list of active applications in the active application menu displayed in 2214.

Figure 3:
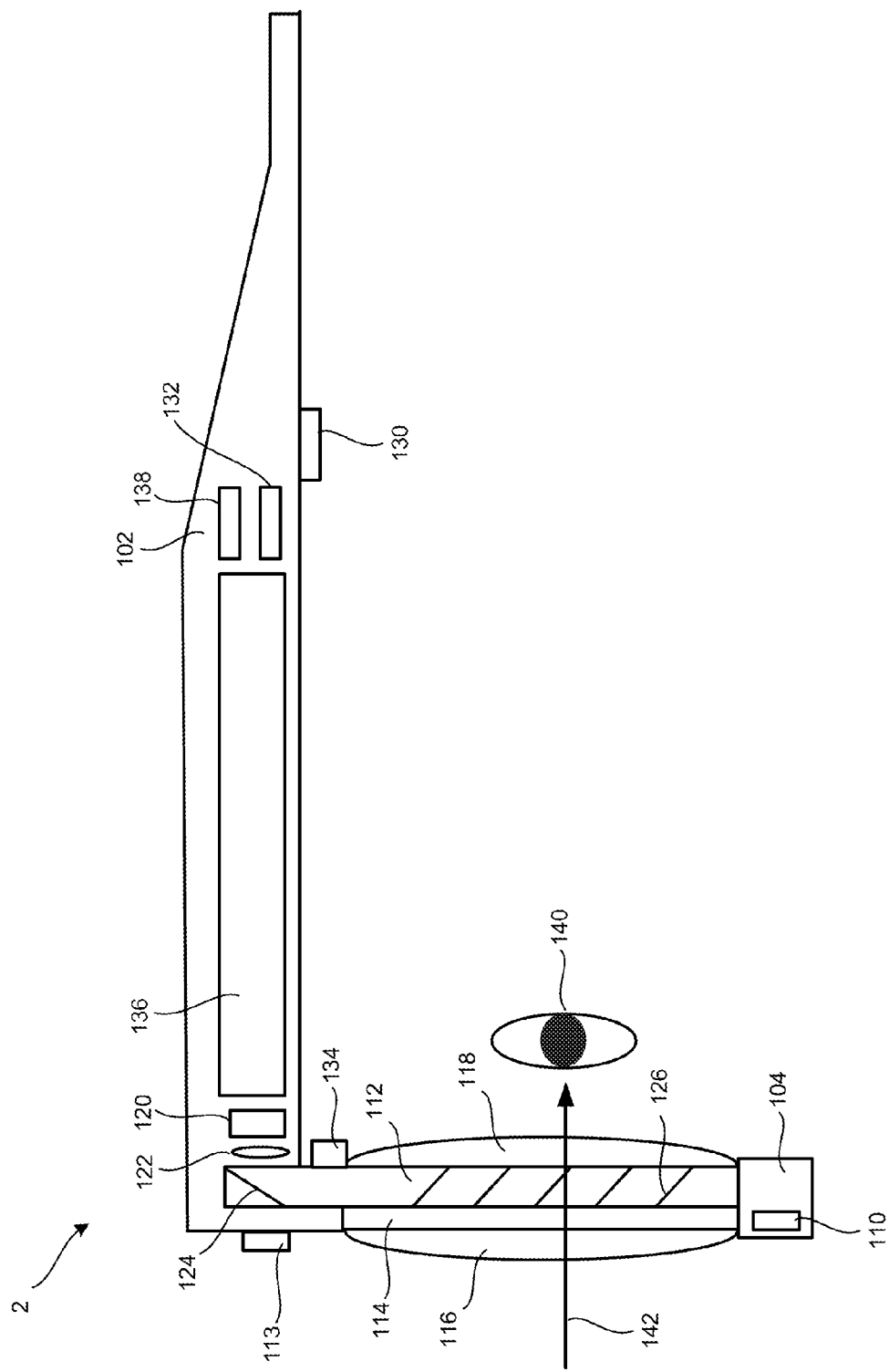
FIG. 3 is a top view of a portion of one embodiment of a head mounted display unit.

FIG. 3 depicts a top view of a portion of head mounted display device 2, including a portion of the frame that includes temple 102 and nose bridge 104. Only the right side of head mounted display device 2 is depicted. At the front of head mounted display device 2 is a physical environment facing camera 113 (also referred to as a room facing camera 113) that can capture video and still images. Those images are transmitted to processing unit 4, as described below.

In one embodiment, physical environment facing camera 113 is a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera. For example, the depth camera may include an IR illuminator transmitter and a hot reflecting surface like a hot mirror in front of the visible image sensor which lets the visible light pass and directs reflected IR radiation within a wavelength range transmitted by the illuminator to a CCD or other type of depth sensor. The data from the sensors may be sent to the processing unit 4 or hub computing system 12 for processing. The processing identifies and maps the user's real world field of view. Additionally, physical environment facing camera 113 may also include a light meter for measuring ambient light.

A portion of the frame of head mounted display device 2 will surround a display (that includes one or more lenses). In order to show the components of head mounted display device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, light-guide optical element 112 is behind and aligned with opacity filter 114, and see-through lens 118 is behind and aligned with light-guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below.

Mounted to or inside temple 102 is an image source, which (in one embodiment) includes micro display assembly 120 for projecting a virtual image and lens 122 for directing images from micro display 120 into light guide optical element 112. In one embodiment, lens 122 is a collimating lens.

Control circuits 136 provide various electronics that support the other components of head mounted display device 2. More details of control circuits 136 are provided below with respect to FIGS. 4A and 4B. Inside, or mounted to temple 102, are ear phones 130, inertial and/or magnetic sensors 132 and temperature sensor 138. In one embodiment inertial and magnetic sensors 132 include a three axis magnetometer 132A, three axis gyro 132B and three axis accelerometer 132C (See FIG. 4A). The inertial and/or magnetic sensors are for sensing position, orientation, and sudden accelerations of head mounted display device 2.

Micro display 120 projects an image through lens 122. There are different image generation technologies that can be used to implement micro display 120. For example, micro display 120 can be implemented in using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, inc. are all examples of reflective technologies which are efficient as most energy is reflected away from the modulated structure and may be used in the system described herein. Additionally, micro display 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, PDLC (Polymer dispersed Liquid Crystal) or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 99% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

Head mounted display device 2 may also include a system for tracking the position of the user's eyes. For example, head mounted display device 2 includes eye tracking assembly 134 which will include an eye tracking illumination device 134A (see FIG. 4A) and eye tracking camera 134B (see FIG. 4A). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detects the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the eye tracking illumination device 134A will use four IR LEDs and the eye tracking camera 134B users four IR photo detectors (not illustrated) in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the eye position, much like as discussed above. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used. Suitable tracking technologies is disclosed in U.S. patent application Ser. No. 12/972,100, "Optimized Focal Area for Augmented Reality Displays," filed on Dec. 17, 2010, which is incorporated herein by reference in their entirety.

FIG. 3 only shows half of head mounted display device 2. A full head mounted display device 2 would include (where applicable) another set lenses, another opacity filter another light guide optical element, another micro display, another lens, room facing camera, eye tracking assembly, micro display, earphones, and temperature sensor.

Figure 4A:
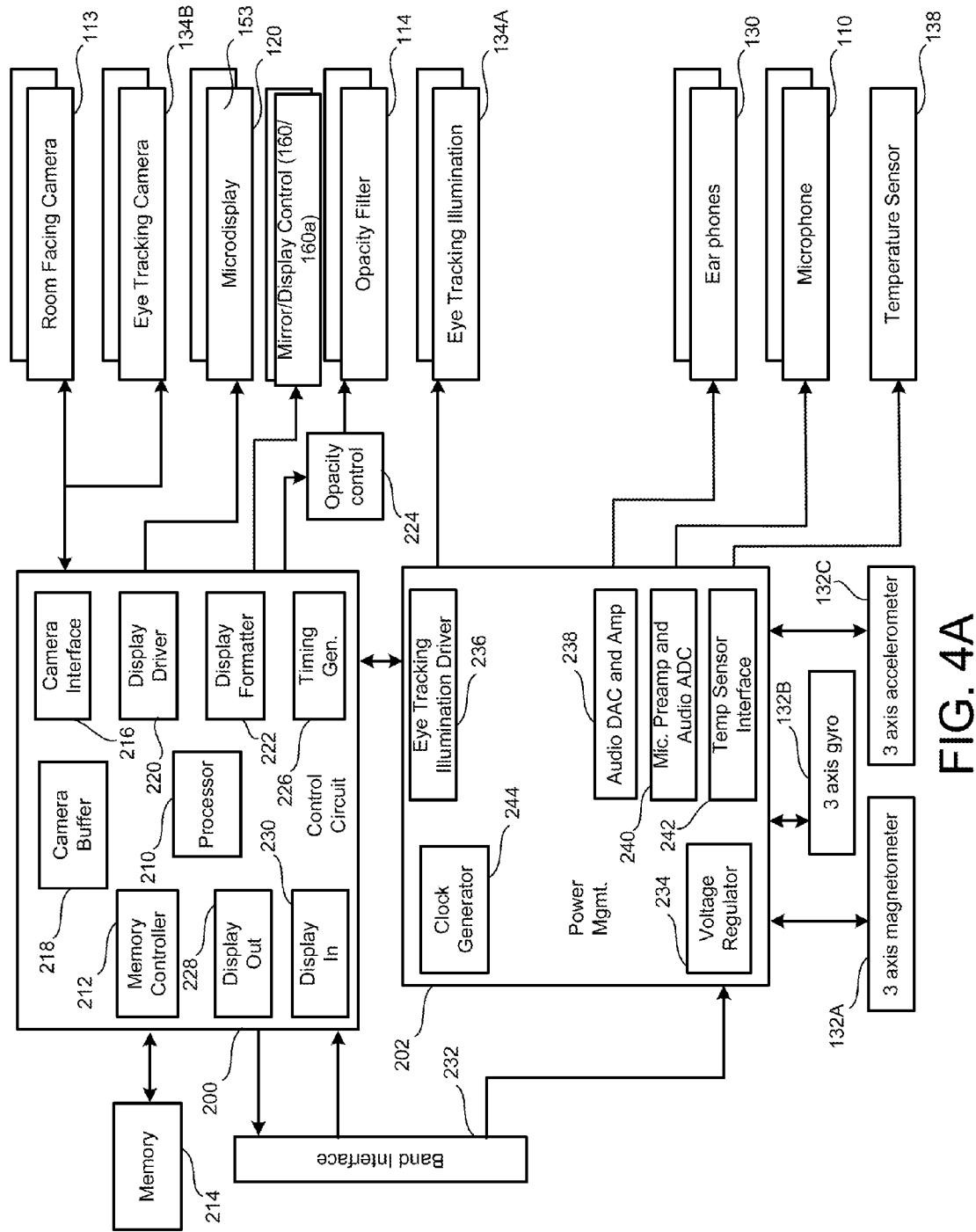
FIG. 4A is a block diagram of one embodiment of the components of a head mounted display unit.
Figure 4B:
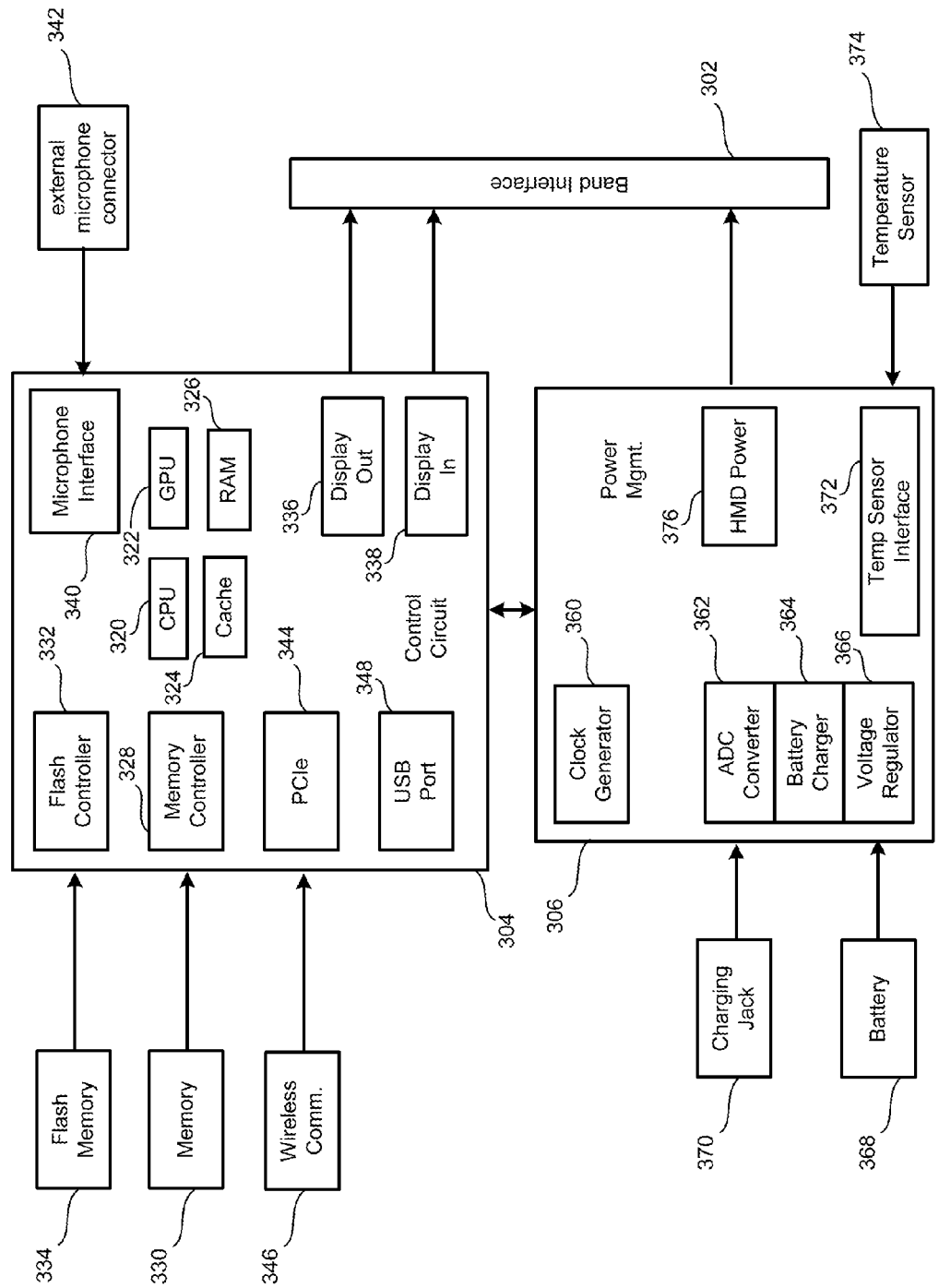
FIG. 4B is a block diagram of one embodiment of the components of a processing unit associated with a head mounted display unit.

FIG. 4A is a block diagram depicting the various components of head mounted display device 2. It will be understood with reference to FIG. 3 that some components illustrated in FIG. 4A may not be present in the embodiment shown in FIG. 3. FIG. 4B is a block diagram describing the various components of processing unit 4 of FIG. 1. Head mounted display device 2, the components of which are depicted in FIG. 4A, is used to display an optimized image to the user (user 2222). Additionally, the head mounted display device components of FIG. 4A may include many sensors that track various conditions including the head position and rotation of user 2222. Head mounted display device 2 will receive instructions about the virtual image from processing unit 4 and will provide the sensor information back to processing unit 4. Processing unit 4, the components of which are depicted in FIG. 4B will receive the sensory information from head mounted display device 2 and also from hub computing device 12 (See FIG. 1). Based on that information, processing unit 4 will determine where and when to provide a virtual image to the user and send instructions accordingly to the head mounted display device of FIG. 4A.

Note that some of the components of FIG. 4A (e.g., room facing camera 113, eye tracking camera 134B, micro display 120 or 153, opacity filter 114, eye tracking illumination 134A, and earphones 130) are shown in shadow to indicate that there may be two of each of those devices, one for the left side and one for the right side of head mounted display device 2. FIG. 4A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 113 and stores images received from the room facing cameras in camera buffer 218. Display driver 220 will drive micro display 120 or 153. Display formatter 222 provides information, about the virtual image being displayed on micro display 120 or 153, to opacity control circuit 224, which controls opacity filter 114. Timing generator 226 is used to provide timing data for the system. Display out interface 228 is a buffer for providing images from room facing cameras 113 to processing unit 4. Display in 230 is a buffer for receiving images such as a virtual image to be displayed on micro display 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 receive the audio information from earphones 130. Microphone preamplifier and audio ADC 240 provide an interface for microphone 110. Temperature sensor interface 242 is an interface for temperature sensor 138. Power management unit 202 also provides power and receives data back from three axis magnetometer 132A, three axis gyro 132B and three axis accelerometer 132C.

FIG. 4B is a block diagram describing the various components of processing unit 4. FIG. 4B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

The above-described system will be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to include reflectivity and shadows. In one embodiment, head mounted display device 2, processing unit 4 and hub computing device 12 work together as each of the devices includes a subset of sensors that are used to obtain the data for determining where, when and how to insert the virtual images. In one embodiment, the calculations that determine where, how and when to insert a virtual image are performed by hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 2.

In one example embodiment, hub computing device 12 will create a model of the environment that the user is in and track various moving objects in that environment. In addition, hub computing device 12 tracks the field of view of the head mounted display device 2 by tracking the position and orientation of head mounted display device 2. The model and the tracking information are provided from hub computing device 12 to processing unit 4. Sensor information may also be obtained from head mounted display device 2. Processing unit 4 then uses the additional sensor information it receives from head mounted display device 2 to refine the field of view of the user and provide instructions to head mounted display device 2 on how, where and when to insert the virtual image.

Figure 5:
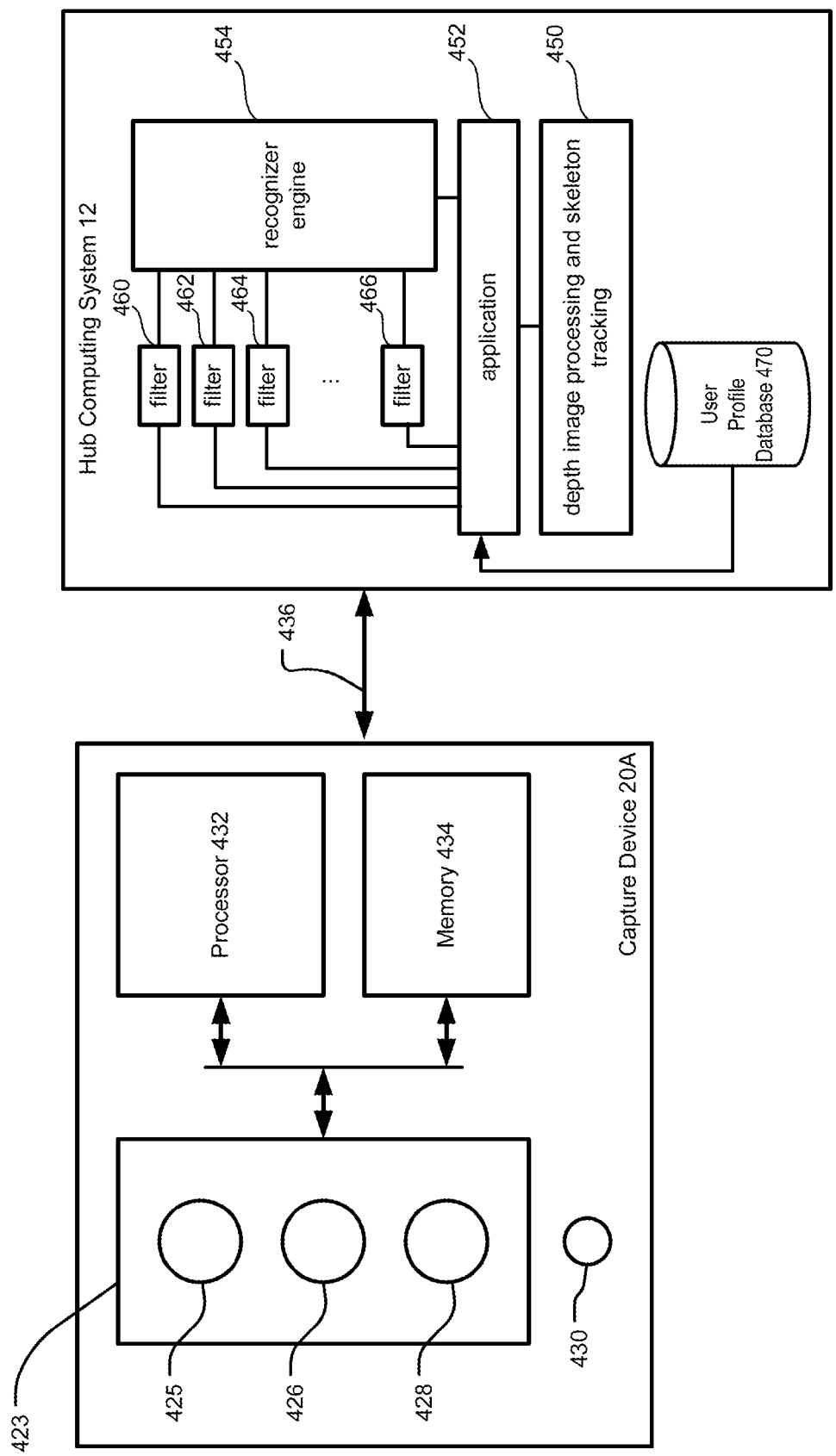
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A. According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 453, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Filters 460, 462, 464, . . . , 466 are loaded and implemented on top of the recognizer engine 454 and can utilize services provided by recognizer engine 454 to all filters 460, 462, 464, . . . , 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

In one embodiment, hub computing system 12 includes a user profile database 470 that includes user-specific information related to one or more users interacting with hub computing system 12. In one example, the user-specific information includes information related to a user such as the user's expressed preferences, the user's friends' list, the user's preferred activities, a list of the user's reminders, the user's social groups, the user's current location, the user's past intents to interact with objects in the user's environment and other user created content, such as the user's photos, images and recorded videos. In one embodiment, the user-specific information may be obtained from one or more data sources such as the user's social networking sites, address book, email data, Instant Messaging data, user profiles or other sources on the Internet. In one approach, and as will be discussed in detail below, the user-specific information is utilized to automatically determine the user's intent to interact with one or more objects in the user's environment.

Figure 6:
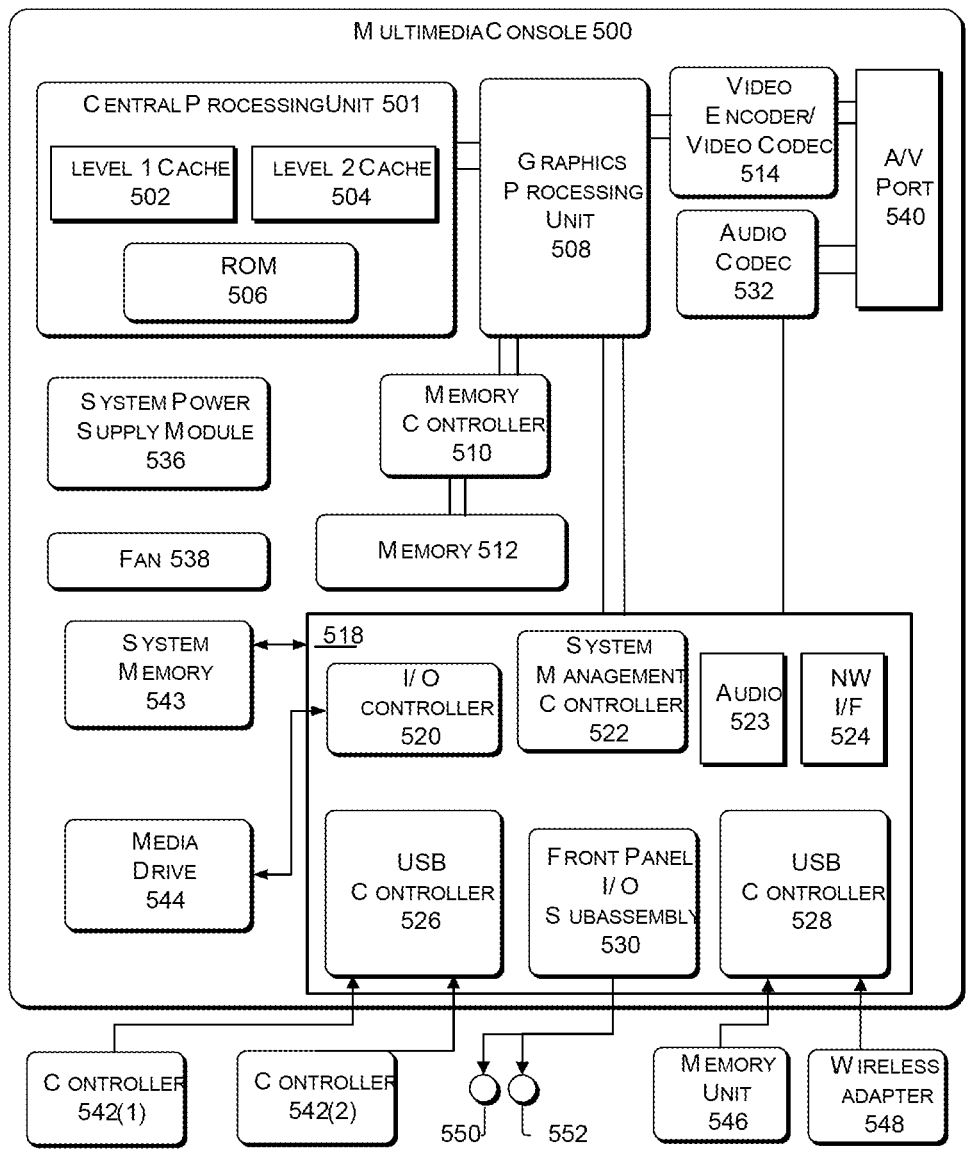
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542 (2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. The implementation of hub computing system 12 does not require any particular hardware architecture.

As described above, the total field of view for the user which accounts for a complete range of rotation and translation of the user's head may be determined by tracking the user's head position and rotation relative to the environment and the user's body. The total field of view for the user is a function of: the user's environment or scene, the user's head position and rotation, and the user's body.

Figure 7:
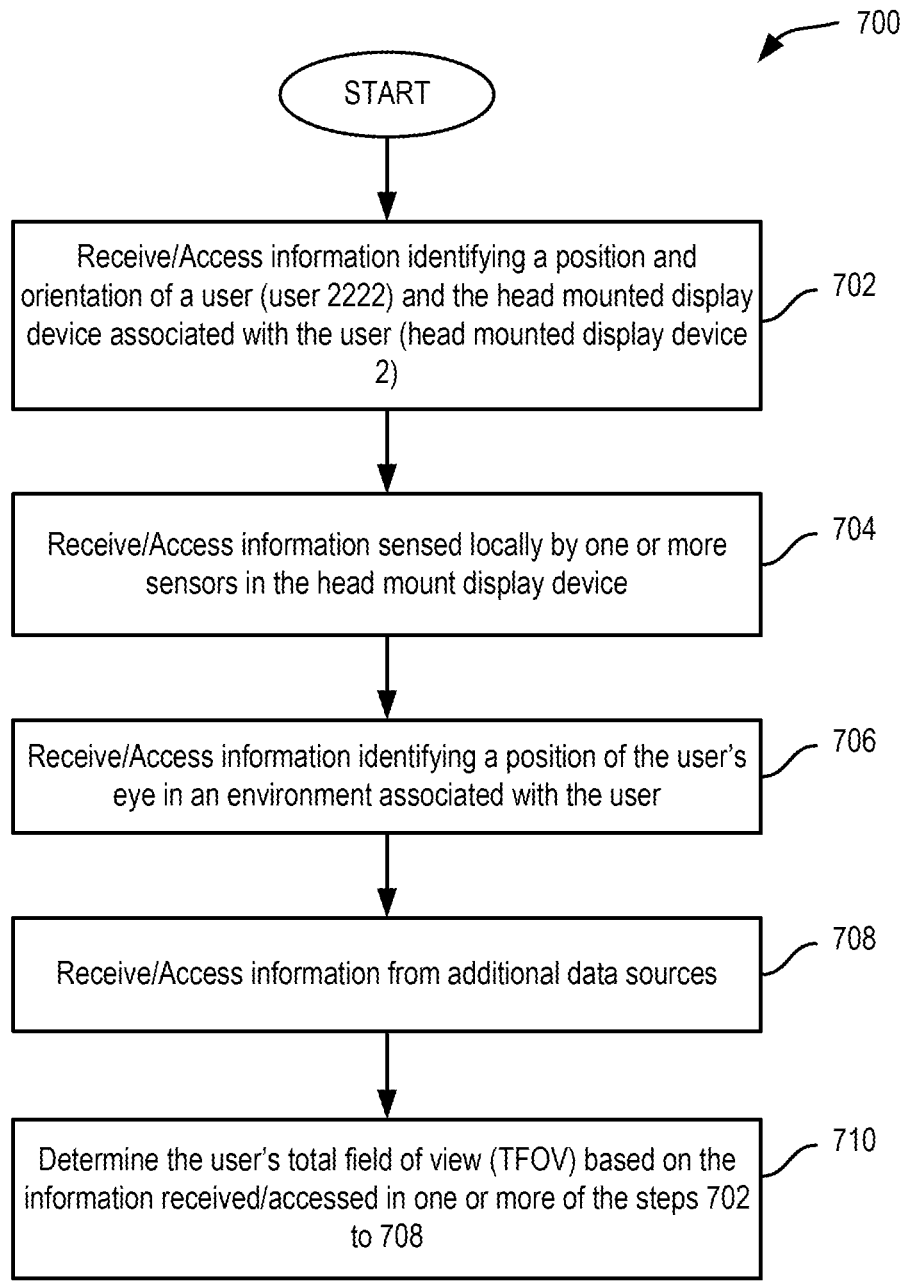
FIG. 7 is a simplified flow chart depicting one embodiment of a process for determining a total field of view associated with a user.

FIG. 7 is a simplified flow chart depicting one embodiment of a process 700 for determining a total field of view associated with a user. The processing depicted in FIG. 7 may be performed by head mounted display device 2, processing unit 4 and/or hub computing device 12 as each of the devices includes a subset of sensors that are used to obtain the sensor data for determining the total field of view for the user, as discussed below. The processing depicted in FIG. 7 provides more details for step 2202 of FIG. 2A.

It should be noted that steps 702 to 708 illustrated in FIG. 7 may be performed in parallel or simultaneously, and steps 702 to 708 may be performed continuously such that the user's head is continuously tracked for determining the total field of view associated with the user.

It should also be recognized that not all sensor information received/accessed in steps 702 to 708 are required at all times. Therefore, one or more of steps 702 to 708 may be used as redundancies to further refine the measurement of the total field of view of the user.

At 702, information identifying the position and orientation of a user (user 2222) and the head mounted display device associated with the user (head mounted display device 2) is received. Alternatively, process 700 access the information identifying the position and orientation of the user and the head mounted display device associated with the user that it has already received. In one embodiment, information identifying the position and orientation of the user and the head mounted display device associated with the user is transmitted from the hub computing device 12 and received by processing unit 4. For example, hub computing device 12 will use one or more depth images and one or more visual images to track a user (e.g., using skeleton tracking). One or more depth images and one or more visual images can be used to determine the position and orientation of the user and the head mounted display device associated with the user.

At 704, information sensed locally (e.g., from the head mounted device 2) by one or more sensors embedded in the head mounted display device 2 is received or accessed. Various sensor technologies embedded in the head mounted display including the accelerometer, magnetometer and gyroscope, or other sensor technologies may be used to identify user position and orientation in an environment. Other sensor technologies may include time of flight, spatial scan, mechanical linkages, phase-difference sensing, and/or direct field sensing. In one embodiment of step 704, processing unit 4 will access data from three axis gyro 132B, three axis accelerometer 132C, and three axis magnetometer 132A. The information sensed locally in step 704 may be used to refine (or otherwise update) the position and orientation information received in step 702.

At 706, information identifying a position of the user's eye in the environment is received or accessed. This is also known as the "eye tracking" as discussed above. For example, in one embodiment for tracking a position of the user's eye in the environment, the user's eye can be illuminated using infrared light from eye tracking illumination 134A. The reflection from the eye is detected using one or more eye tracking cameras 134B. The reflection data is sent from head mounted display device 2 to processing unit 4. Processing unit 4 will determine the position of the eye based on the reflection data, as discussed above. In one embodiment, the information identifying a position of the user's eye in the environment is received or accessed in step 706 by processing unit 4. Suitable tracking technologies is disclosed in U.S. patent application Ser. No. 12/972,100, "Optimized Focal Area for Augmented Reality Displays," filed on Dec. 17, 2010, which is incorporated herein by reference in their entirety.

At 708, information from additional data sources is received or accessed. For example, information from additional data sources may include information retrieved from the cloud, information detected and/or gathered by one or more external devices, and other relevant information such as environmental typography obtained using data from the cloud and/or depth sensor data. In one embodiment, the information from additional data sources is received or accessed in step 708 by processing unit 4.

At step 710, the user's total field of view through head mounted display 2 is determined based on the information received or accessed in one or more of the steps 702 to 708. In one embodiment, step 710 is performed by processing unit 4. For example, based on the sensor data received from hub computing system 12 and from other sensors embedded in head mounted display device 2, processing unit 4 determines that the user is facing a wall, and therefore, his point of the view through the head mounted display could include anywhere along the wall. However, based on eye tracking information received, it is determined that the user's eyes are pointed to the right, then step 710 will conclude that the total field of view of the user is only the right hand portion of the wall. Thus, the position and rotation of the use's head relative to the user's body and the environment can be determined using any number of techniques and is used in conjunction with eye position tracking to determine the user's total field of view.

The processing steps of FIG. 7 can be performed continuously such that the user's total field of view is continuously tracked as the user moves his or her head.

As discussed above, an application menu comprising a list of applications that can be activated or launched in head mounted display device 2 may be displayed in a first region of the user's total field of view. One or more applications from the list of applications provided in the application menu may be targeted and activated by a user via the application menu.

Figure 8:
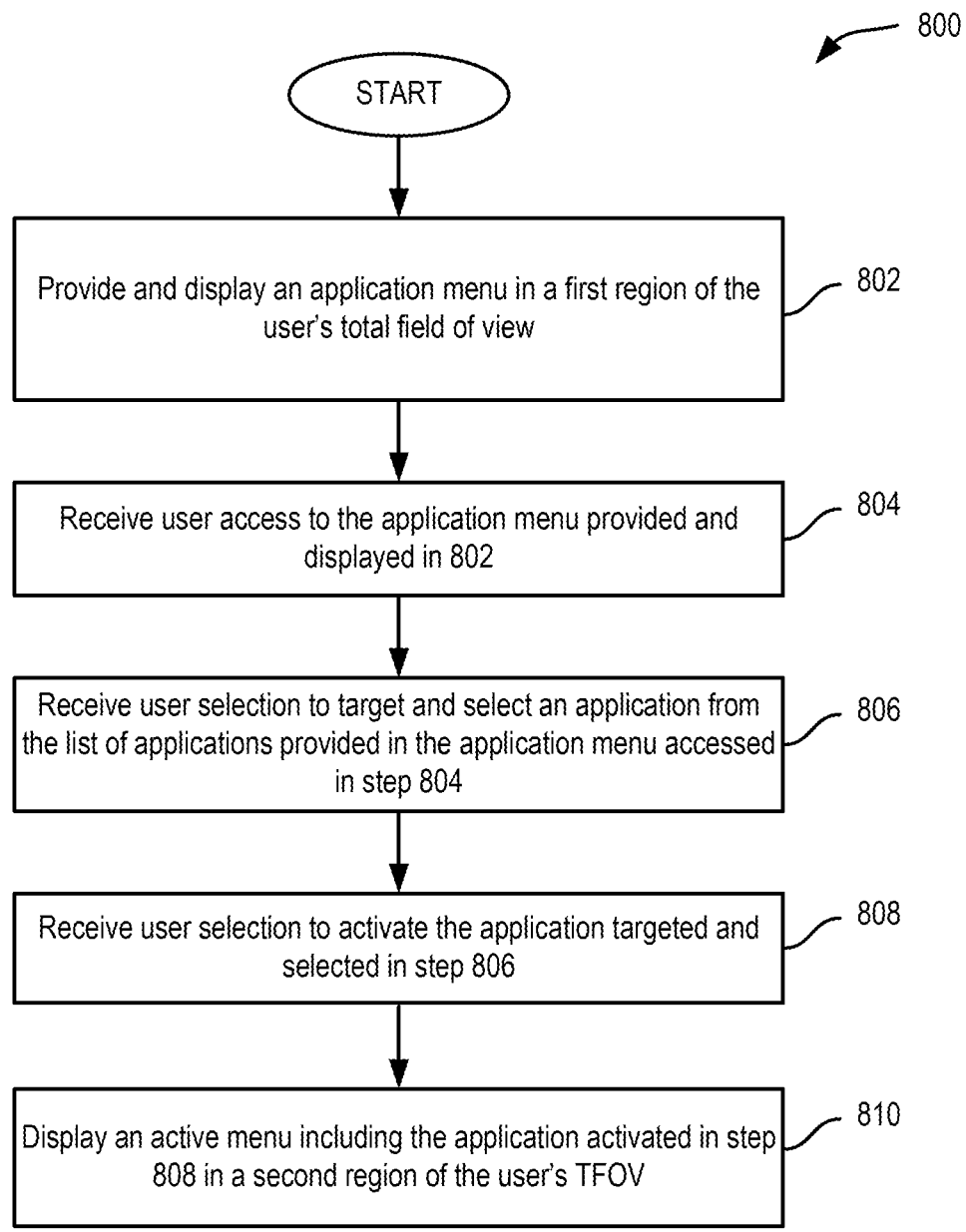
FIG. 8 is a simplified flow chart depicting one embodiment of a process for activating an application.

FIG. 8 is a simplified flow chart depicting one embodiment of a process 800 for targeting and activating an application. The processing depicted in FIG. 8 may be performed head mounted display device 2, processing unit 4 and/or hub computing device 12. The processing depicted in FIG. 8 provides more details for step 2208 of FIG. 2A.

At 802, an application menu comprising a list of one or more applications that can be activated or launched in head mounted display device 2 is provided in a first region of the user's total field of view (also known as the visor menu for launching applications in the head mounted display device). In one embodiment, processing unit 4 determines a first region of the user's total field of view based on one or more preconfigured rules and displays an application menu in the first region of the user's total field of view. For example, an application menu comprising a list of one or more applications that can be activated or launched in head mounted display device may be displayed on the right-hand side of the user's total field of view as determined above.

At 804, process 800 receives user access to the application menu provided in step 802. For example, the user may access the application menu provided in step 802 by turning his head to the first region of the user's total field of view to view the application menu displayed within that region. Alternatively, the user may access the application menu provided in step 802 via eye gaze.

At 806, process 800 receive user selection to target and select an application from the list of applications provided in the application menu accessed in step 804. As discussed above, user 2222 may target and select an application by using various mechanisms including inertial sensing, RGB camera, depth sensor, eye tracking (gaze detection), voice recognition, physical input devices (e.g., mouse, phone, remote control device, etc.), and/or other mechanisms and technologies. In one embodiment, the user may target and select an application by physically 'touching' the application such as shown in FIG. 2D. In this case, the user's physical motion is detected and tracked by using depth sensor and/or RGB cameras. Alternatively, non-direct manipulation techniques such as eye gazing and/or physical inputs through a secondary device (e.g., mouse, phone, etc.) may be used to target and select an application from the application menu. For example, the user may target and select an application provided in the application menu by pressing a button on a secondary device.

At 808, process 800 receive user selection to activate the application targeted and selected by user 2222 in step 806. As discussed above, various mechanisms may be used to activate an application. For example, an application may be activated via direct manipulation (e.g., using depth sensor and/or RGB cameras) or non-direct manipulation techniques such as eye gazing and/or physical inputs through a secondary device (e.g., press a button on a mouse, phone, etc.). For direct manipulation, FIG. 2E shows that user 2222 activates application 2262*a* by physically 'pulls' the application over the user's primary field-of-view. The application activated by user 2222 in step 808 is currently running in the user's primary field-of-view, as shown in FIG. 2F.

At 810, the application that was activated in step 808 is inserted to and displayed in an active menu. As discussed above, an active menu (also known as the active-visors menu) comprises a list of one or more active applications currently running in the head mounted display device and is displayed in a second region of the user's total field of view. For example, an active menu comprising a list of one or more active applications currently running in the head mounted display device may be displayed on the left-hand side of the user's total field of view as determined above.

As mentioned earlier, an active menu comprising a list of applications that are currently running in head mounted display device 2 may be displayed in a second region of the user's total field of view, and one or more applications from the list of applications provided in the active menu may be targeted and de-activated by a user via the active menu.

Figure 9:
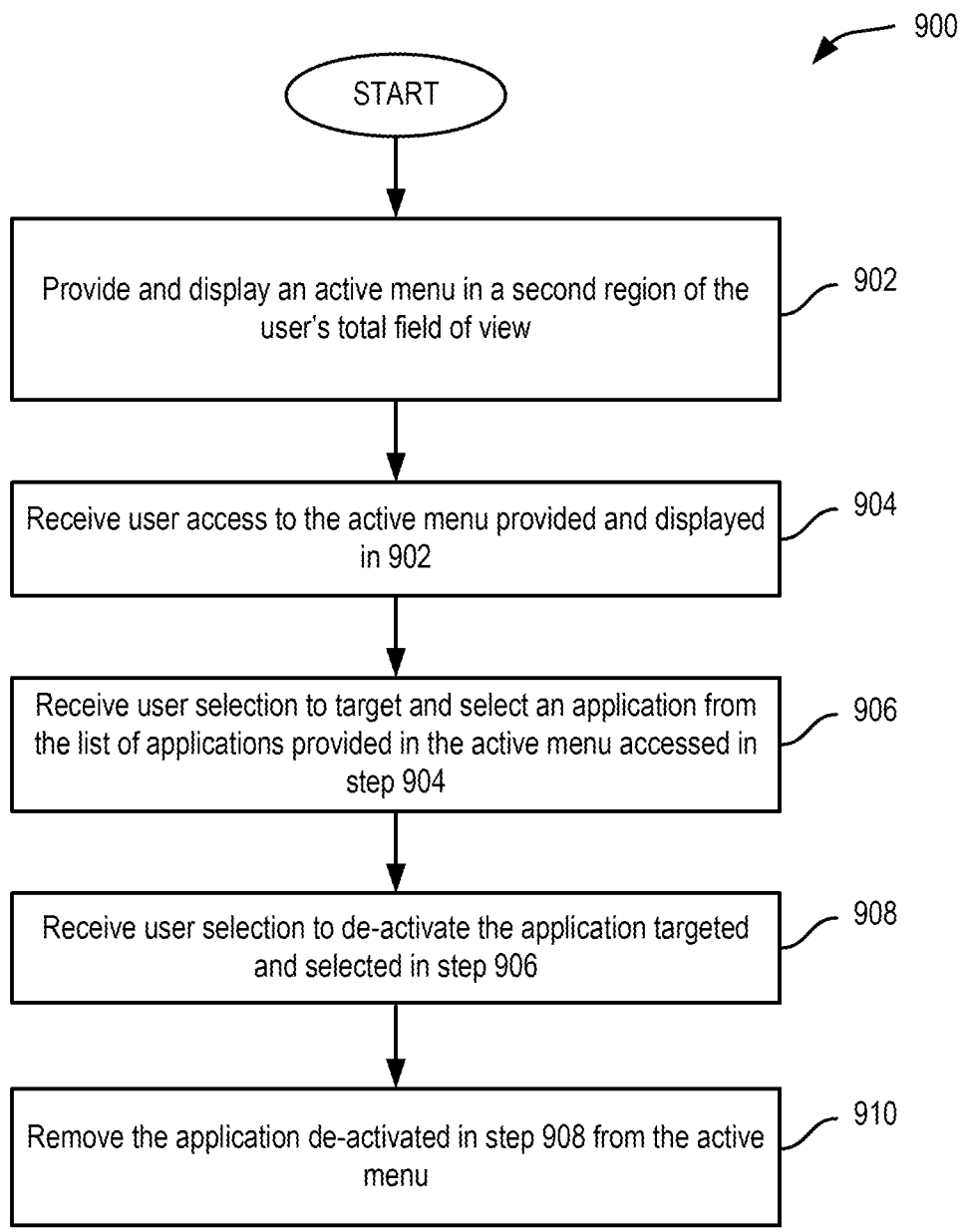
FIG. 9 is a simplified flow chart depicting one embodiment of a process for de-activating an application that is currently running in a head mounted display device.

FIG. 9 is a simplified flow chart depicting one embodiment of a process 900 for targeting and de-activating an application that is currently running in a head mounted display device.

The processing depicted in FIG. 9 may be performed by head mounted display device 2, processing unit 4 and/or hub computing device 12. The processing depicted in FIG. 9 provides more details for step 2216 of FIG. 2A.

At 902, an active menu comprising a list of one or more applications that are currently running in head mounted display device 2 is provided in a second region of the user's total field of view (also known as the active-visors menu). In one embodiment, processing unit 4 determines a second region of the user's total field of view based on one or more preconfigured rules and displays an application menu in the second region of the user's total field of view. For example, an active menu comprising a list of one or more active applications currently running in the head mounted display device may be displayed on the left-hand side of the user's total field of view as determined above.

At 904, process 900 receives user access to the active menu provided in step 902. For example, the user may access the active menu provided in step 902 by turning his head to the second region of the user's total field of view to view the active menu displayed within that region. Alternatively, the user may access the active menu provided in step 902 via eye gaze.

At 906, process 900 receives user selection to target and select an application from the list of applications provided in the active menu access by the user. As discussed above, user 2222 may target and select an application provided in an active menu by using various mechanisms including inertial sensing, RGB camera, depth sensor, eye tracking (gaze detection), voice recognition, physical input devices (e.g., mouse, phone, remote control device, etc.), and/or other mechanisms and technologies. In one embodiment, the user may target and select an application provided in an active menu by physically 'touching' the application such as that shown in FIG. 2I. In this case, the user's physical motion is detected and tracked by using depth sensor and/or RGB cameras. Alternatively, non-direct manipulation techniques such as eye gazing and/or physical inputs through a secondary device (e.g., mouse, phone, etc.) may be used to target and select an application provided in an active menu. For example, the user may target and select an application provided in the active menu by pressing a button on a secondary device.

At 908, process 900 receives user selection to de-activate the application targeted and selected by user 2222 in step 906. As discussed above, various input mechanisms may be used to de-activate an application. For example, an application may be de-activated via direct manipulation (e.g., using depth sensor and/or RGB cameras) or non-direct manipulation techniques such as eye gazing and/or physical inputs through a secondary device (e.g., press a button on a mouse, phone, etc.). For example, FIG. 2J shows that user 2222 de-activates application 2262a by physically 'pulls' the application across the user's field-of-view.

At 910, the application de-activated in step 908 is removed from the active menu, as shown in FIG. 2K.

Thus, by providing an application menu and an active menu in a first region and a second region of a user's total field of view such as described above, a user can manage one or more applications running in a head-mounted display device associated with the user.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for providing a user interface to manage one or more applications in a head mounted display device associated with a user, comprising:
    determining a total field of view of a user in a real world three-dimensional space through the head mounted display device, the total field of view representing a range of views of the user of the real world three-dimensional space over a period of time and over a continuous range of rotation of the user's head, the total field of view being a combined view of previously viewed regions in the period of time plus a current view being observed in a primary field of view through the head mounted display but being less than all views of the real world three-dimensional space, the total field of view being larger than the primary field of view of the user at a single instant in time;
    dividing the total field of view into at least a first region in three-dimensional space and a second region in three-dimensional space, the first region and the second region being non-overlapping;
    generating a first menu including a first list of one or more applications;
    displaying the first menu in a first position in the first region of the total field of view of the user;
    receiving a user selection to activate an application from the first list of one or more applications provided in the first menu;
    generating a second menu including a second list of one or more applications, the second list of one or more applications including the application that has been activated from the first list of one or more applications provided in the first menu; and
    displaying the second menu in a second position in the second region of the total field of view of the user.

2. The method of claim 1 wherein displaying the first menu in the first region of the total field of view of the user includes selecting the first region within the total field of view of the user based on one or more configured rules.

3. The method of claim 2, wherein displaying the first menu in the first region of the total field of view of the user includes displaying the first menu on a right-hand side of the total field of view of the user.

4. The method of claim 1, wherein receiving a user selection to activate an application from the first list of one or more applications provided in the first menu includes detecting a user action.

5. The method of claim 4, wherein the user action includes the user dragging the application from the first list of one or more applications provided in the first menu over a primary field-of-view of the user.

6. The method of claim 1, wherein the second region of the total field of view is opposite to the first region.

7. The method of claim 1, wherein the one or more applications provided in the second menu run concurrently and are overlaid on top of each other in the primary field-of-view of the user.

8. The method of claim 1, further comprising receiving a second user selection to de-activate an application from the second list of one or more applications provided in the second menu.

9. The method of claim 8, wherein the second user selection to de-activate an application from the second list of one or more applications provided in the second menu includes dragging the application from the second region toward the first region across the primary field-of-view of the user.

10. A head mounted display device, comprising:
    a display;
    one or more sensors tracking head position and rotation of a user relative to a body of the user and relative to an environment associated with the user; and
    at least one processing unit, in communication with the display, the one or more sensors, the at least one processing unit including instructions for a processing device to perform a method including:
        determining a total field of view of the user of a real world three-dimensional space through the head mounted display device, the total field of view representing areas of the real world space in view of the user over a continuous range of rotation of the user's head over a period of time, the total field of view being a combined view of previously viewed regions in the period of time plus a current view being observed in a primary field of view through the head mounted display but being less than all views of the real world three-dimensional space, the total field of view being larger than the primary field of view of the user at an instant in time;
        dividing the total field of view into at least a first three-dimensional region mapping to a first physical location in the environment of the user, and a second three-dimensional region mapping to a second physical location in the environment of the user different than the first physical location, the first three-dimensional region and the second three-dimensional region being non-overlapping;
        generating a first menu including a first list of one or more applications;
        displaying the first menu in a first position in the first three-dimensional region of the total field of view of the user;

receiving a first user selection by the user touching or pointing to the first position to activate an application from the first list of one or more applications provided in the first menu;

generating a second menu including a second list of one or more applications, the second list of one or more applications including the application that has been activated from the first list of one or more applications provided in the first menu; and displaying the second menu in the second three-dimensional region of the total field of view of the user.

11. The head mounted display device of claim 10, wherein the first user selection includes dragging the application from the first list of one or more applications provided in the first menu over the primary field-of-view of the user.

12. The head mounted display device of claim 10, wherein the at least one processing unit receives a second user selection to de-activate an application from the second list of one or more applications provided in the second menu.

13. A method comprising:
tracking head position and rotation of a user relative to a body of the user and relative to an environment associated with the user;

determining a total field of view of the user of a real world three-dimensional space through a head mounted display device associated with the user based on the head position and rotation tracked, the total field of view representing areas of the environment visible to the user over a continuous range of movement of the user's head over a period of time, the total field of view being a combined view of previously viewed regions in the period of time plus a current view being observed in a primary field of view through the head mounted display but being less than all views of the real world three-dimensional space, the total field of view being larger than the primary field of view of the user at a single instant in time;

dividing the total field of view into at least a first three-dimensional region mapping to a first physical location in the environment of the user, a second three-dimensional region mapping to a second physical location in the environment of the user different than the first physical location, and a third three-dimensional region mapping to a third physical location in the environment of the user different than the first and second physical locations, the first three-dimensional region and the second three-dimensional region being non-overlapping;

generating a first menu including a first list of one or more applications that can be activated in the head mounted display device;

displaying the first menu in a first position in the first three-dimensional region of the total field of view of the user;

receiving a first user selection by a user touching or pointing to the first position to activate an application from the first list of one or more applications provided in the first menu;

generating a second menu including a second list of one or more applications, the one or more applications of the second list of one or more applications running concurrently and overlaid on top of each other in the third three-dimensional region of the total field of view of the user, the second list of one or more applications including the application that has been activated from the first list of one or more applications provided in the first menu;

displaying the second menu in a second position in the second three-dimensional region of the total field of view of the user;

receiving a second user selection by a user touching or pointing to the second position to de-activate an application from the second list of one or more applications provided in the second menu; and removing the application that has been de-activated from the second list of one or more applications provided in the second menu responsive to the second user selection.

14. The method of claim 13, wherein receiving a first user selection to activate an application from the first list of one or more applications provided in the first menu includes detecting a user action.

15. The method of claim 13, wherein the third region of the total field-of-view of the user is the primary field-of-view of the user.

16. The method of claim 13, wherein the second user selection to de-activate an application from the second list of one or more applications provided in the second menu includes dragging the application from the second region toward the first region across the primary field-of-view of the user.

17. The method of claim 13 further comprising selecting the first region and the second region based on one or more configured rules.

\* \* \* \* \*